US010957209B2

(12) United States Patent
Campos Macias et al.

(10) Patent No.: US 10,957,209 B2
(45) Date of Patent: Mar. 23, 2021

(54) METHODS AND APPARATUS FOR PREVENTING COLLISIONS BETWEEN DRONES BASED ON DRONE-TO-DRONE ACOUSTIC COMMUNICATIONS

(71) Applicant: Intel Corporation, Santa Clara, CA (US)

(72) Inventors: Leobardo Campos Macias, Guadalajara (MX); Hector Cordourier Maruri, Guadalajara (MX); David Gomez Gutierrez, Tlaquepaque (MX); Rodrigo Aldana Lopez, Zapopan (MX); Jose Parra Vilchis, Guadalajara (MX)

(73) Assignee: INTEL CORPORATION, Santa Clara, CA (US)

(*) Notice: Subject to any disclaimer, the term of this patent is extended or adjusted under 35 U.S.C. 154(b) by 185 days.

(21) Appl. No.: 16/141,527

(22) Filed: Sep. 25, 2018

(65) Prior Publication Data
US 2019/0051197 A1 Feb. 14, 2019

(51) Int. Cl.
G08G 5/04 (2006.01)
B64C 39/02 (2006.01)
(Continued)

(52) U.S. Cl.
CPC .......... G08G 5/045 (2013.01); B64C 39/024 (2013.01); G08C 23/02 (2013.01); G08G 5/0008 (2013.01);
(Continued)

(58) Field of Classification Search
CPC ..... G01S 13/933; G01S 15/93; B64C 39/024; B64C 2201/141; B64C 2201/146;
(Continued)

(56) References Cited

U.S. PATENT DOCUMENTS 3,913,084 A * 10/1975 Bollinger .............. G01H 3/12
340/683
3,968,697 A * 7/1976 Mutziger .............. G01H 3/14
73/647
(Continued)

FOREIGN PATENT DOCUMENTS

CN 203950449 U * 11/2014
JP 02193089 A * 7/1990
(Continued)

OTHER PUBLICATIONS

EPO machine translation of JP 02-193089 (original JP document published Jul. 30, 1990) (Year: 1990).*

(Continued)

Primary Examiner — Faris S Almatrahi
Assistant Examiner — David A Testardi
(74) Attorney, Agent, or Firm — Hanley, Flight & Zimmerman, LLC

(57) ABSTRACT

Methods and apparatus for preventing collisions between drones based on drone-to-drone acoustic communications are disclosed. A control system of a first drone includes a route manager to command the first drone to track a first route. The control system further includes a plurality of acoustic sensors arranged on the first drone to detect acoustic signals. The control system further includes a collision prevention engine to determine a second route based on acoustic signals detected by the acoustic sensors, the acoustic signals being received from a second drone while the first drone is tracking the first route. The second route differs from the first route to prevent a drone-to-drone collision between the first drone and the second drone. The collision prevention engine is to cause the route manager to command the first drone to track the second route instead of the first route.

24 Claims, 10 Drawing Sheets

(51) Int. Cl.
*G08G 5/00* (2006.01)
*G08C 23/02* (2006.01)

(52) U.S. Cl.
CPC ......... *G08G 5/0021* (2013.01); *G08G 5/0039* (2013.01); *G08G 5/0069* (2013.01); *B64C 2201/146* (2013.01)

(58) Field of Classification Search
CPC ........ G08G 5/0069; G08G 5/04; G08G 5/045; G05D 1/0094; G05D 1/101; G05D 1/104; G05D 1/1064; G05D 1/0255; H04B 11/00
See application file for complete search history.

(56) References Cited

U.S. PATENT DOCUMENTS

| | | | | |
|---|---|---|---|---|
| 5,006,988 | A * | 4/1991 | Borenstein | G05D 1/0255 180/169 |
| 5,165,064 | A * | 11/1992 | Mattaboni | G05D 1/0234 356/141.2 |
| 5,185,728 | A * | 2/1993 | Gilchrist | G10K 9/122 181/175 |
| 5,961,568 | A * | 10/1999 | Farahat | G08G 5/0078 701/120 |
| 7,606,115 | B1 * | 10/2009 | Cline | G01S 3/8083 367/124 |
| 2009/0027253 | A1 * | 1/2009 | van Tooren | G08G 5/045 342/29 |
| 2010/0039310 | A1 * | 2/2010 | Smith | G01S 13/781 342/29 |
| 2012/0093339 | A1 * | 4/2012 | Wu | G01S 3/8083 381/92 |
| 2014/0279101 | A1 * | 9/2014 | Duplan | G06Q 20/223 705/18 |
| 2015/0160658 | A1 * | 6/2015 | Reedman | G05D 1/102 701/3 |
| 2015/0277440 | A1 * | 10/2015 | Kimchi | G08G 5/0078 701/26 |
| 2016/0069994 | A1 * | 3/2016 | Allen | G01S 13/933 342/29 |
| 2016/0247405 | A1 * | 8/2016 | Paczan | G08G 5/0069 |
| 2017/0219686 | A1 * | 8/2017 | Xie | H04R 1/04 |
| 2017/0356999 | A1 * | 12/2017 | Xie | G01S 15/06 |
| 2018/0322348 | A1 * | 11/2018 | Sweet | G01S 17/933 |
| 2018/0348350 | A1 * | 12/2018 | Remond | G01S 15/93 |
| 2019/0035288 | A1 * | 1/2019 | Beltman | B64C 39/024 |
| 2019/0072635 | A1 * | 3/2019 | Kang | G10K 11/36 |
| 2019/0154439 | A1 * | 5/2019 | Binder | G01S 15/08 |
| 2020/0117211 | A1 * | 4/2020 | Paglieroni | G05D 1/0274 |
| 2020/0143178 | A1 * | 5/2020 | Bomphrey | G01S 15/08 |
| 2020/0174477 | A1 * | 6/2020 | Li | G05D 1/106 |

FOREIGN PATENT DOCUMENTS

| | | | | |
|---|---|---|---|---|
| JP | 2006030173 | A | * | 2/2006 |
| JP | 2007205906 | A | * | 8/2007 |
| JP | 2010071746 | A | * | 4/2010 |
| JP | 2016202053 | A | * | 12/2016 |
| JP | 2018144772 | A | * | 9/2018 |
| WO | WO-2013/032332 | A1 | * | 3/2013 |
| WO | WO-2018/155231 | A1 | * | 8/2018 |
| WO | WO-2018/208784 | A1 | * | 11/2018 |

OTHER PUBLICATIONS

Shim, David H., "Decentralized nonlinear model predictive control of multiple flying robots", Proceedings of the 42nd IEEE Conference on Decision and Control, Maui, Hawaii USA, Dec. 2003, paper ThMO1-6, 6 pages (Year: 2003).*

Nieuwenhuisen, Matthias et al., "Predictive potential field-based collision avoidance for multicopters", International Archives of the Photogrammetry, Remote Sensing and Spatial Information Sciences, ISPRS Archives 2013, vol. XL-1/W2, 2013, UAV-g2013, Sep. 4-6, 2013, 6 pages (Year: 2013).*

Holz, Dirk et al., "Towards Multimodal Omnidirectional Obstacle Detection for Autonomous Unmanned Aerial Vehicles", International Archives of the Photogrammetry, Remote Sensing and Spatial Information Sciences, ISPRS Archives 2013, vol. XL-1/W2, 2013, UAV-g2013, Sep. 4-6, 2013, 6 pages (Year: 2013).*

EPO machine translation of CN 203950449 U (original CN document published Nov. 19, 2014) (Year: 2014).*

EPO machine translation of JP 2018-144772 A (original JP document published Sep. 20, 2018) (Year: 2018).*

* cited by examiner $k = 5$
$M = 8$

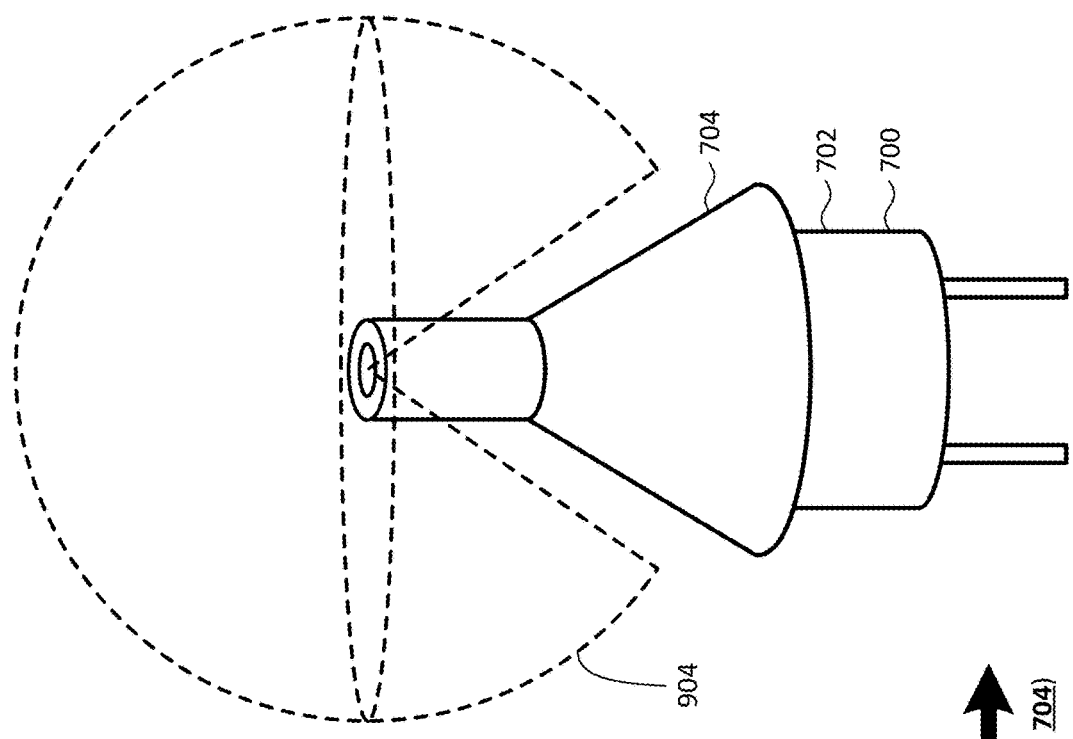
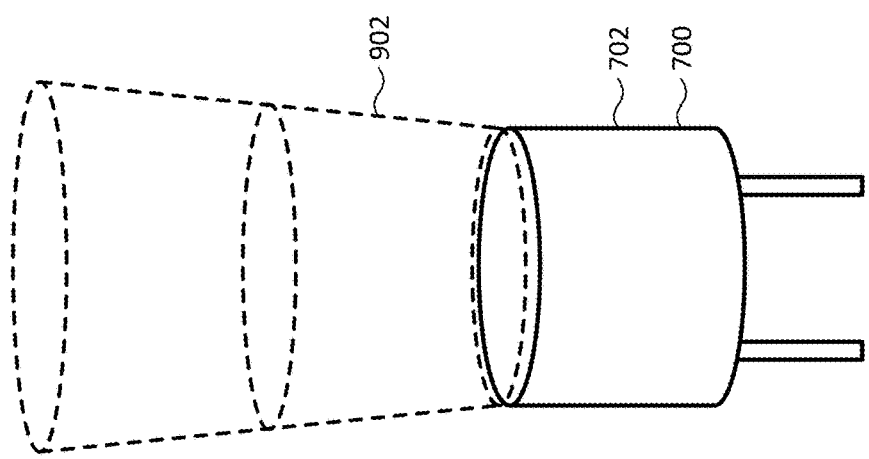
FIG. 9B
FIG. 9A

METHODS AND APPARATUS FOR PREVENTING COLLISIONS BETWEEN DRONES BASED ON DRONE-TO-DRONE ACOUSTIC COMMUNICATIONS

FIELD OF THE DISCLOSURE

This disclosure relates generally to methods and apparatus for preventing collisions between drones and, more specifically, to methods and apparatus for preventing collisions between drones based on drone-to-drone acoustic communications.

BACKGROUND

Multiple drones (e.g., a swarm of drones) may simultaneously travel (e.g., according to respective programmed routes) through and/or within a common airspace. Congestion (e.g., lack of adequate spacing) between and/or among the drones traveling through and/or within the airspace may result in a collision between two or more of the drones. A drone-to-drone collision within an airspace presents safety risks not only to the drones involved in the collision, but also to objects (e.g., other drones, vehicles, buildings, etc.) and individuals (e.g., humans) located within, below, and/or proximate to the airspace at the time of the collision.

BRIEF DESCRIPTION OF THE DRAWINGS

FIGS. 9A and 9B illustrate the example case of the example acoustic transmitter of FIGS. 7 and 8 converting an example cylindrical acoustic waveform into an example spherical acoustic waveform.

Figure 1:
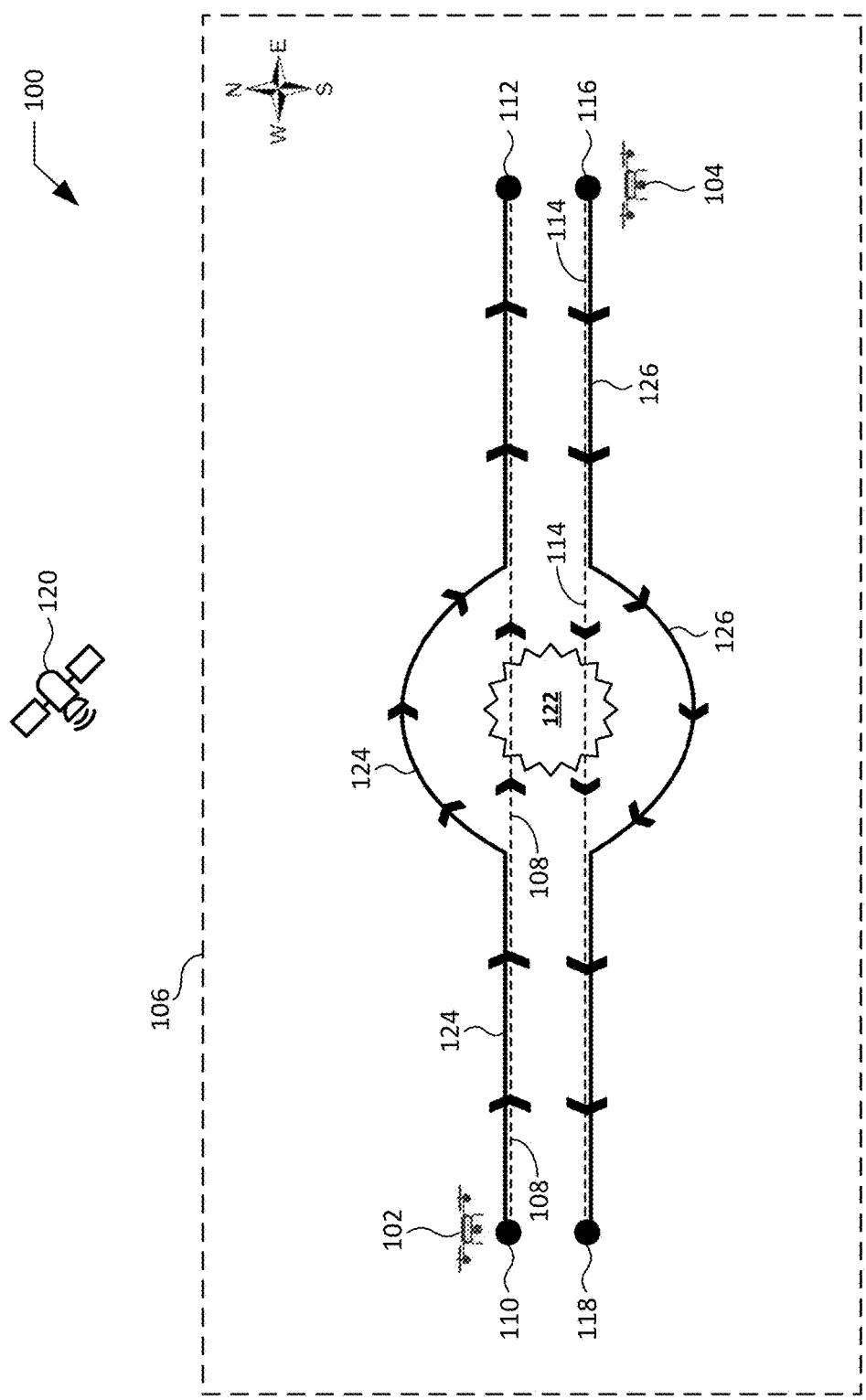
FIG. 1 illustrates an example environment of use in which multiple drones simultaneously traveling through and/or within a common airspace may implement methods and apparatus in accordance with teachings of this disclosure to prevent drone-to-drone collisions.

Certain examples are shown in the above-identified figures and described in detail below. In describing these examples, identical reference numbers are used to identify the same or similar elements. The figures are not necessarily to scale and certain features and certain views of the figures may be shown exaggerated in scale or in schematic for clarity and/or conciseness.

DETAILED DESCRIPTION

Multiple drones (e.g., a swarm of drones) may simultaneously travel (e.g., according to respective programmed routes) through and/or within a common airspace. In some instances, respective ones of the drones traveling through and/or within the airspace may interact (e.g., intentionally or unintentionally) in close proximity relative to on another. Congestion (e.g., lack of adequate spacing) between and/or among the respective ones of the drones traveling through and/or within the airspace may result in a collision between two or more of the drones. A drone-to-drone collision within an airspace presents safety risks not only to the drones involved in the collision, but also to objects (e.g., other drones, vehicles, buildings, etc.) and individuals (e.g., humans) located within, below, and/or proximate to the airspace at the time of the collision. It is accordingly important, if not essential, to prevent such drone-to-drone collisions from occurring.

A first known method and/or system for preventing drone-to-drone collisions relies on external localization performed at a remotely located server to determine the respective locations of corresponding respective drones traveling through and/or within an airspace, and to further determine respective evasive maneuvers and/or modified routes for the corresponding respective ones of the drones. The respective ones of the determined evasive maneuvers and/or modified routes must be communicated (e.g., via radio circuitry over a radio and/or cellular network) from the remotely located server to the corresponding respective ones of the drones. The first known method and/or system for preventing drone-to-drone collisions has several disadvantages including, for example, the requirement and/or need for substantial infrastructure (e.g., a server, radio and/or cellular base stations, radio and/or cellular network hardware, etc.) that is external and/or remote to the respective ones of the drones. The external and/or remote nature of such infrastructure necessitates strong communication requirements when the drones traveling within the airspace are substantial in number and/or traveling in close proximity relative to one another, as may occur in the case of a swarm of drones.

A second known method and/or system for preventing drone-to-drone collisions relies on external anchors (e.g., GPS anchors, ultra-wideband (UWB) anchors, etc.) that enable respective ones of the drones traveling through and/or within an airspace including such external anchors to self-localize via multilateration techniques. Thus, only local communication is required for a drone to share its location with other (e.g., neighboring) drones traveling through and/ or within the airspace, and/or for a drone to account for the respective locations of the corresponding respective ones of the other drones when the drone is planning and/or executing its route. The second known method and/or system is accordingly less centralized relative to the first known method and/or system described above, as the collision prevention determinations associated with the second known method and/or system are performed locally at the respective ones of the drones. The second known method and/or system for preventing drone-to-drone collisions has several disadvantages including, for example, the requirement and/or need for external anchors placed and/or located at suitable positions throughout and/or within the airspace. The placement and/or location of such external anchors necessitates strong communication requirements when the drones traveling within the airspace are substantial in number and/or traveling in close proximity relative to one another, as may occur in the case of a swarm of drones.

A third known method and/or system for preventing drone-to-drone collisions relies on on-board sensors (e.g., cameras, radars, lidars, etc. coupled and/or integral to a drone) that enable a drone traveling through and/or within an airspace to account for the respective locations of other drones traveling through and/or within the airspace when the drone is planning and/or executing its route. The third known method and/or system is accordingly less centralized relative to both the first and the second known methods and/or systems described above, as the collision prevention determinations associated with the third known method and/or system are performed locally at the respective ones of the drones without the aid of external infrastructure and/or external anchors. The third known method and/or system for preventing drone-to-drone collisions has several disadvantages including, for example, substantial costs and increased communication requirements associated with the on-board sensors, the need for complex visual and/or positional recognition algorithms, etc.

Unlike the known methods and systems for preventing drone-to-drone collisions described above, example methods and apparatus disclosed herein advantageously implement drone-to-drone acoustic communications to prevent drone-to-drone collisions. In some disclosed example methods and apparatus, a drone traveling through and/or within an airspace receives acoustic signals (e.g., ultrasonic acoustic signals) from one or more other drone(s) traveling through and/or within the airspace. In some disclosed example methods and apparatus, the drone accounts for (e.g., in real time or near real time) the location(s) of the other drone(s), based on the received acoustic signals, while the drone is following and/or tracking a predetermined (e.g., first) route. In some disclosed example methods and apparatus, the drone includes a collision prevention engine that, based on the received acoustic signals, determines an updated (e.g., second) route to be followed and/or tracked by the drone to prevent a drone-to-drone collision involving the drone and at least one of the one or more other drone(s). In some disclosed example methods and apparatus, the collision prevention engine causes the drone to follow and/or track the updated (e.g., second) route instead of the predetermined (e.g., first) route. In some disclosed example methods and apparatus, the drone broadcasts an acoustic signal of its own to at least one of the one or more other drone(s), thereby facilitating an exchange of drone-to-drone acoustic communications between and/or among respective ones of the drones that may be traveling through and/or within the airspace. The use of drone-to-drone acoustic (e.g., ultrasonic) communications by the example methods and apparatus disclosed herein advantageously eliminates any need for the external infrastructures, external anchors, costly on-board sensors, and/or complex visual and/or positional recognition algorithms required by the above-described known methods and systems for preventing drone-to-drone collisions. The use of drone-to-drone acoustic (e.g., ultrasonic) communications by the example methods and apparatus disclosed herein is also more efficient battery-wise, requires less spectrum allocation, and is less prone to interference compared to the use of radio communications.

FIG. 1 illustrates an example environment of use 100 in which multiple drones simultaneously traveling through and/or within a common airspace may implement methods and apparatus in accordance with teachings of this disclosure to prevent drone-to-drone collisions. In the illustrated example of FIG. 1, the environment of use 100 includes a first example drone 102 and a second example drone 104 respectively shown traveling through and/or within an example airspace 106 of the environment of use 100. In other examples, the environment of use 100 may include a greater number of drones (e.g., 10, 100, 1000, etc.) traveling through and/or within the airspace 106. In some examples, respective ones of the drones may be configured and/or programmed to operate as a coordinated drone swarm within the airspace 106. The airspace 106 of FIG. 1 is not meant as a restriction on where the first drone 102 and/or the second drone 104 may travel. Instead, it is an abstraction to illustrate an area in proximity to the first drone 102 and the second drone 104. The airspace 106 of FIG. 1 may be of any size and/or shape, depending on implementation details.

Routes and/or travel paths of the drones traveling through and/or within the airspace 106 of FIG. 1 may be based on reference location data (e.g., a launch location, one or more waypoint(s), etc.) and destination location data known to and/or communicated to the drones. For example, the first drone 102 of FIG. 1 may be programmed and/or commanded to travel within the airspace 106 along a first example route 108 from a first example reference location 110 to a first example destination location 112. As another example, the second drone 104 of FIG. 1 may be programmed and/or commanded to travel within the airspace 106 along a second example route 114 from a second example reference location 116 to a second example destination location 118.

The first drone 102 and the second drone 104 of FIG. 1 respectively include a GPS receiver to collect and/or receive location data determined via example GPS satellites 120. For example, the first drone 102 of FIG. 1 includes a first GPS receiver to collect and/or receive first location data determined via the GPS satellites 120, and the second drone 104 of FIG. 1 includes a second GPS receiver to collect and/or receive first location data determined via the GPS satellites 120. Location data collected and/or received via respective ones of the GPS receivers enables the corresponding respective drone (e.g., the first drone 102 or the second drone 104 of FIG. 1) to determine, detect, and/or identify its current location within the airspace 106.

The first drone 102 and the second drone 104 of FIG. 1 also respectively include a controller to command the drone to track and/or follow its corresponding route. For example, the first drone 102 of FIG. 1 includes a first controller to command the first drone 102 to track and/or follow the first route 108, and the second drone 104 of FIG. 1 includes a second controller to command the second drone 104 to track and/or follow the second route 114. In some examples, the first controller of the first drone 102 may compare the current location of the first drone 102 within the airspace 106 to one or more reference location(s) associated with the first route 108. In response to identifying one or more deviation(s) between the compared data, the first controller may command the first drone 102 in a manner that minimizes the deviation(s), thereby causing the first drone 102 to track and/or follow the first route 108. Similarly, the second controller of the second drone 104 may compare the current location of the second drone 104 within the airspace 106 to one or more reference location(s) associated with the second route 114. In response to identifying one or more deviation(s) between the compared data, the second controller may command the second drone 104 in a manner that minimizes the deviation(s), thereby causing the second drone 104 to track and/or follow the second route 114.

In the illustrated example of FIG. 1, an example drone-to-drone collision 122 may occur between the first drone 102 traveling along the first route 108 and the second drone 104 traveling along the second route 114 as a result of congestion (e.g., lack of adequate spacing) between the first drone 102 and the second drone 104. The drone-to-drone collision 122 presents safety risks not only to the two drones involved in the collision, but also to objects (e.g., other drones, vehicles, buildings, etc.) and individuals (e.g., humans) that may be located within, below, and/or proximate to the airspace 106 at the time of the drone-to-drone collision 122.

The first drone 102 and the second drone 104 of FIG. 1 respectively implement and/or include a collision prevention engine to advantageously prevent drone-to-drone collisions (e.g., the drone-to-drone collision 122 of FIG. 1) from occurring. For example, the first drone 102 of FIG. 1 implements and/or includes a first collision prevention engine to prevent the first drone 102 from colliding with the second drone 104 as the first drone 102 and the second drone 104 simultaneously travel through and/or within the airspace 106, and the second drone 104 of FIG. 1 implements and/or includes a second collision prevention engine to prevent the second drone 104 from colliding with the first drone 102 as the second drone 104 and the first drone 102 simultaneously travel through and/or within the airspace 106.

In the illustrated example of FIG. 1, respective ones of the first and second collision prevention engines of the corresponding respective ones of the first and second drones 102, 104 prevent the drone-to-drone collision 122 from occurring by modifying the first route 108 of the first drone 102 and/or the second route 114 of the second drone 104 in response to drone-to-drone acoustic communications exchanged between the first and second drones 102, 104. In this regard, the first drone 102 of FIG. 1 includes a first acoustic transmitter and a first array of acoustic sensors, and the second drone 104 of FIG. 1 includes a second acoustic transmitter and a second array of acoustic sensors. The first acoustic transmitter of the first drone 102 of FIG. 1 broadcasts and/or emits one or more acoustic signal(s) that may be received, sensed, detected and/or measured by and/or at one or more acoustic sensor(s) from among the second array of acoustic sensors of the second drone 104 of FIG. 1. Conversely, the second acoustic transmitter of the second drone 104 of FIG. 1 broadcasts and/or emits one or more acoustic signal(s) that may be received, sensed, detected and/or measured by and/or at one or more acoustic sensor(s) from among the first array of acoustic sensors of the first drone 102 of FIG. 1. Thus, the first drone 102 and the second drone 104 of FIG. 1 exchange drone-to-drone acoustic communications with one another.

The first collision prevention engine of the first drone 102 of FIG. 1 determines RMS values associated with acoustic signals received (e.g., from the second drone 104, and/or from other drones traveling through and/or within the airspace 106), detected, sensed and/or measured by and/or at respective ones of the acoustic sensors of the first array of acoustic sensors. The first collision prevention engine of the first drone 102 of FIG. 1 determines force values corresponding to the RMS values, and generates a first collision prevention model based on the force values. The first collision prevention engine of the first drone 102 of FIG. 1 implements and/or executes the first collision prevention model to modify and/or adjust the first route 108 of the first drone 102, and/or to cause the first controller of the first drone 102 to command the first drone 102 to track and/or follow an example updated first route 124 that is modified and/or adjusted relative to the first route 108 of FIG. 1. The first collision prevention engine of the first drone 102 of FIG. 1 accordingly prevents the first drone 102 from colliding with the second drone 104 while the first drone 102 and the second drone 104 are simultaneously traveling through and/or within the airspace 106 of FIG. 1.

Similarly, the second collision prevention engine of the second drone 102 of FIG. 1 determines RMS values associated with acoustic signals received (e.g., from the first drone 102, and/or from other drones traveling through and/or within the airspace 106), detected, sensed and/or measured by and/or at respective ones of the acoustic sensors of the second array of acoustic sensors. The second collision prevention engine of the second drone 104 of FIG. 1 determines force values corresponding to the RMS values, and generates a second collision prevention model based on the force values. The second collision prevention engine of the first drone 102 of FIG. 1 implements and/or executes the second collision prevention model to modify and/or adjust the second route 114 of the second drone 104, and/or to cause the second controller of the second drone 104 to command the second drone 104 to track and/or follow an example updated second route 126 that is modified and/or adjusted relative to the second route 114 of FIG. 1. The second collision prevention engine of the second drone 104 of FIG. 1 accordingly prevents the second drone 104 from colliding with the first drone 102 while the second drone 104 and the first drone 102 are simultaneously traveling through and/or within the airspace 106 of FIG. 1.

In examples where the environment of use 100 of FIG. 1 includes a greater number of drones (e.g., 10, 100, 1000, etc.) traveling through and/or within the airspace 106, each drone may include a corresponding acoustic transmitter and a corresponding array of acoustic sensors to enable the exchange of drone-to-drone acoustic communications between and/or among respective ones of the drones located within the airspace 106, and each drone may further include a corresponding collision prevention engine to prevent drone-to-drone collisions between and/or among the respective ones of the drones located within the airspace 106. For example, the above-described structures and/or operations of respective ones of the first and second drones 102, 104 of FIG. 1 may similarly be implemented by respective ones of a plurality of drones that may be configured and/or programmed to operate as a coordinated drone swarm within the airspace 106.

Figure 2:
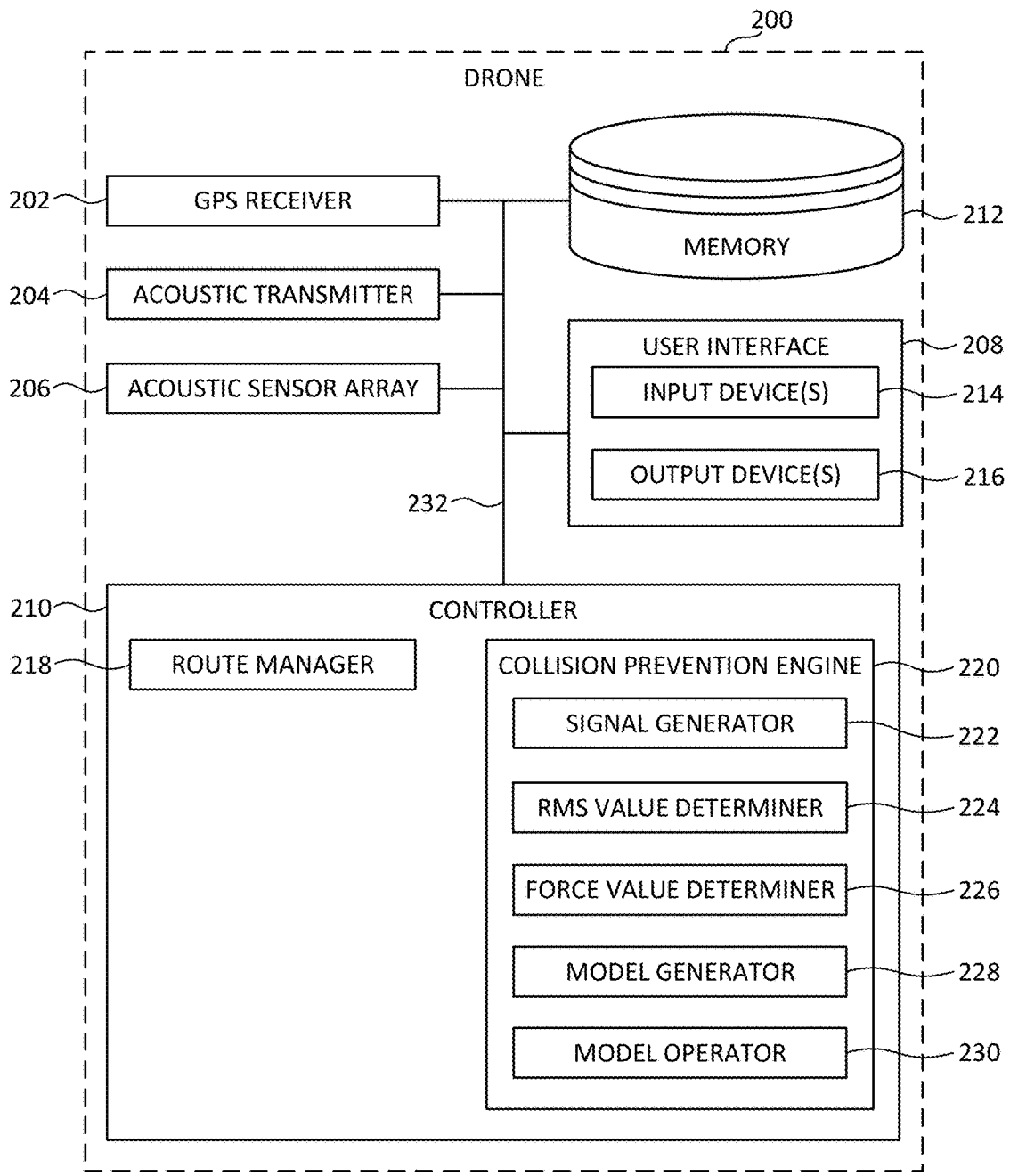
FIG. 2 is a block diagram of an example drone constructed in accordance with teachings of this disclosure.

FIG. 2 is a block diagram of an example implementation of an example drone 200 constructed in accordance with teachings of this disclosure. The block diagram of FIG. 2 may be used to implement any of the first and/or second drones 102, 104 of FIG. 1. In the illustrated example of FIG. 2, the drone 200 includes an example GPS receiver 202, an example acoustic transmitter 204, an example array of acoustic sensors 206, an example user interface 208, an example controller 210, and an example memory 212. The example user interface 208 of FIG. 2 includes one or more example input device(s) 214 and one or more example output device(s) 216. The example controller 210 of FIG. 2 includes an example route manager 218 and an example collision prevention engine 220. The example collision prevention engine 220 of FIG. 2 includes an example signal generator 222, an example root mean square (RMS) value determiner 224, an example force value determiner 226, an example model generator 228, and an example model operator 230. However, other example implementations of the drone 200 may include fewer or additional structures.

In the illustrated example of FIG. 2, the GPS receiver 202, the acoustic transmitter 204, the array of acoustic sensors 206, the user interface 208 (including the input device(s) 214 and the output device(s) 216), the controller 210 (including the route manager 218, the collision prevention engine 220, the signal generator 222, the RMS value determiner 226, the model generator 228, and the model operator 230), and/or the memory 212 are operatively coupled (e.g., in electrical communication) via an example communication bus 232.

The example GPS receiver 202 of FIG. 2 collects, acquires and/or receives data and/or one or more signal(s) from one or more GPS satellite(s) (e.g., represented by the GPS satellite 120 of FIG. 1). Typically, signals from three or more satellites are needed to form the GPS triangulation to identify the location of the drone 200. The data and/or signal(s) received by the GPS receiver 202 may include information (e.g., time stamps) from which the current position and/or location of the drone 200 of FIG. 2 may be identified and/or derived, including for example, the current latitude, longitude and altitude of the drone 200. Location data identified and/or derived from the signal(s) collected and/or received by the GPS receiver 202 may be associated with one or more local time(s) (e.g., time stamped) at which the data and/or signal(s) were collected and/or received by the GPS receiver 202. In some examples, a local clock is used to timestamp the location data to maintain synchronization between the same. The location data identified and/or derived from the signal(s) collected and/or received by the GPS receiver 202 may be of any quantity, type, form and/or format, and may be stored in a computer-readable storage medium such as the example memory 212 of FIG. 2 described below.

The example acoustic transmitter 204 of FIG. 2 broadcasts and/or emits one or more acoustic signal(s) from the drone 200 to one or more other drone(s). For example, the acoustic transmitter 204 may broadcast and/or emit the acoustic signal(s) from the drone 200 to one or more other drone(s) while the drone 200 is airborne and/or tracking a route. The acoustic transmitter 204 of FIG. 2 includes an acoustic transducer (e.g., a speaker, a piezoelectric transducer, etc.) to convert one or more electrical signal(s) generated at the drone 200 into the acoustic signal(s) to be broadcast and/or emitted by the acoustic transmitter 204. In some examples, the acoustic transmitter 204 broadcasts and/or emits the acoustic signal(s) in response to the generation of one or more corresponding signal(s) (e.g., corresponding electrical signal(s)) by the example signal generator 222 of FIG. 2 described below.

In some examples, the acoustic signal(s) broadcast and/or emitted by the acoustic transmitter 204 is/are ultrasonic acoustic signal(s) (e.g., an acoustic signal having a frequency of 20,000 hertz or more). The use and/or implementation of ultrasonic acoustic signal(s) advantageously reduces the level of noise associated with the acoustic transmitter 204 and/or, more generally, the drone 200. Such ultrasonic acoustic signal(s) may also advantageously reduce interference associated with one or more acoustic signal(s) that may be generated by one or more other component(s) (e.g., a motor, a propeller, etc.) of the drone 200. Data corresponding to the acoustic signal(s) to be broadcast and/or emitted by the acoustic transmitter 204 may be of any quantity, type, form and/or format, and may be stored in a computer-readable storage medium such as the example memory 212 of FIG. 2 described below.

Figure 3:
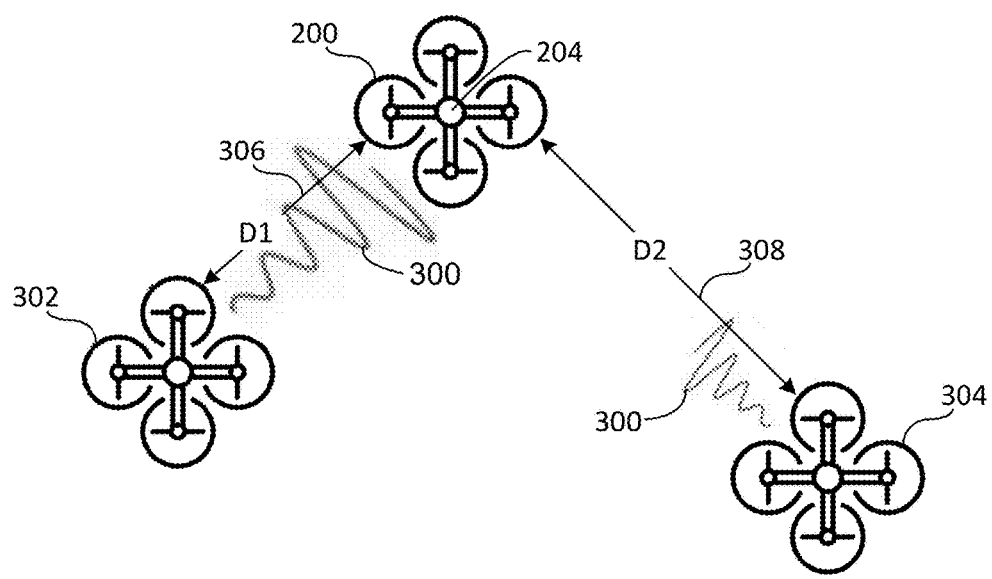
FIG. 3 illustrates an example implementation of the example acoustic transmitter and/or, more generally, the example drone of FIG. 2 broadcasting and/or emitting an example acoustic signal to other example drones.

FIG. 3 illustrates an example implementation of the example acoustic transmitter 204 of FIG. 2 and/or, more generally, the example drone 200 of FIG. 2 broadcasting and/or emitting an example acoustic signal 300 to other example drones. In the illustrated example of FIG. 3, the acoustic signal 300 is shown being broadcast and/or emitted by the acoustic transmitter 204 from the drone 200 to a first example receiver drone 302, and also to a second example receiver drone 304. The first receiver drone 302 is located at a first example distance 306 (indicated as "D1" in FIG. 3) from the drone 200. The second receiver drone 304 is located at a second example distance 308 (indicated as "D2" in FIG. 3) from the drone 200 that is greater than the first distance 306. As shown in FIG. 3, the acoustic signal 300 broadcast and/or emitted by the acoustic transmitter 204 of the drone 200 decays as a function of distance. Thus, the amplitude of the acoustic signal 300 as received, detected, sensed and/or measured at the first receiver drone 302 will be greater than the amplitude of the acoustic signal as received, detected, sensed and/or measured at the second receiver drone 304.

Returning to the illustrated example of FIG. 2, the example array of acoustic sensors 206 of FIG. 2 includes a plurality (e.g., two or more) of acoustic sensors that are arranged (e.g., directionally positioned and/or oriented) to receive, detect, sense and/or measure one or more acoustic signal(s) broadcast and/or emitted from one or more other drone(s). For example, respective ones of the acoustic sensors 206 may receive, detect, sense and/or measure one or more acoustic signal(s) broadcast and/or emitted from one or more other drone(s) while the drone 200 is airborne and/or tracking a route. Respective ones of the acoustic sensors 206 of FIG. 2 include an acoustic transducer (e.g., a directional microphone, a piezoelectric sensor, etc.) to convert the acoustic signal(s) received, detected and/or sensed by and/or at the acoustic sensor into one or more corresponding electrical signal(s) to be measured by and/or at the acoustic sensor, and/or to be processed and/or analyzed by and/or at the example collision prevention engine 220 of FIG. 2 described below.

In some examples, the acoustic signal(s) received, detected, sensed and/or measured by and/or at the acoustic sensors 206 is/are ultrasonic acoustic signal(s) (e.g., an acoustic signal having a frequency of 20,000 hertz or more). The use and/or implementation of ultrasonic acoustic signal(s) advantageously reduces interference associated with one or more acoustic signal(s) that may be generated by one or more other component(s) (e.g., a motor, a propeller, etc.) of the drone 200. Data carried by, identified and/or derived from the acoustic signal(s) received, detected, sensed and/or measured by the array of acoustic sensors 206 may be of any quantity, type, form and/or format, and may be stored in a computer-readable storage medium such as the example memory 212 of FIG. 2 described below.

Figure 4:
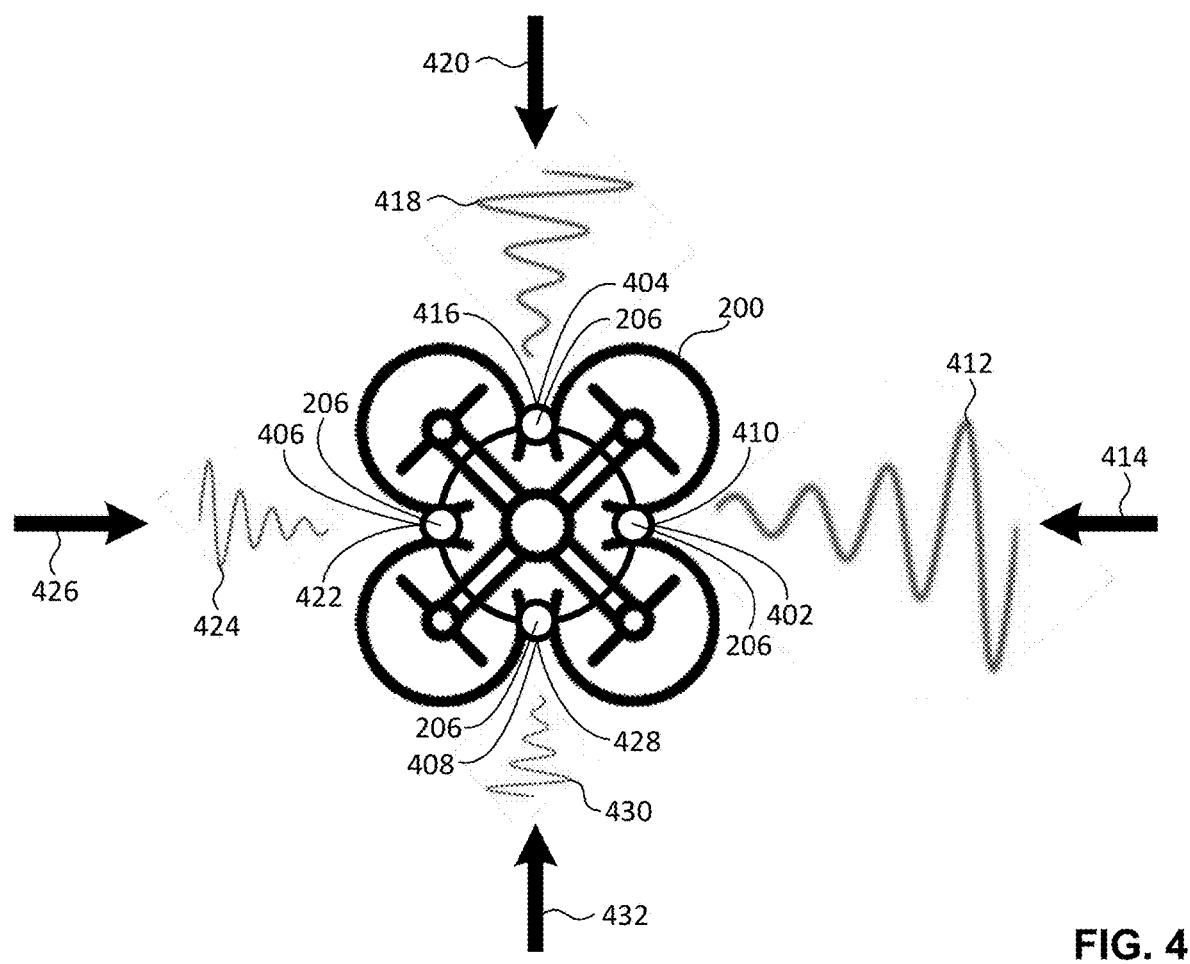
FIG. 4 illustrates an example implementation of the example array of acoustic sensors of FIG. 2 and/or, more generally, the example drone of FIG. 2 receiving and/or detecting example acoustic signals.

FIG. 4 illustrates an example implementation of the example array of acoustic sensors 206 of FIG. 2 and/or, more generally, the example drone 200 of FIG. 2 receiving and/or detecting example acoustic signals. In the illustrated example of FIG. 4, the example array of acoustic sensors 206 includes a first example acoustic sensor 402, a second example acoustic sensor 404, a third example acoustic sensor 406, and a fourth example acoustic sensor 408. Respective ones of the first, second, third and fourth acoustic sensors 402, 404, 406, 408 of FIG. 4 are directional sensors that are arranged (directionally positioned and/or oriented) to receive, detect, sense and/or measure acoustic signals arriving at the drone 200 from different directions.

For example, the first acoustic sensor 402 of FIG. 4 is arranged at a first example angular position 410 (e.g., zero degrees) relative to the center of the drone 200 to receive, detect, sense and/or measure a first example acoustic signal 412 arriving at the drone 200 from a first example direction 414. The second acoustic sensor 404 of FIG. 4 is arranged at a second example angular position 416 (e.g., ninety degrees) relative to the center of the drone 200 to receive, detect, sense and/or measure a second example acoustic signal 418 arriving at the drone 200 from a second example direction 420 that is generally perpendicular to the first direction 414. The third acoustic sensor 406 of FIG. 4 is arranged at a third example angular position 422 (e.g., one hundred eighty degrees) relative to the center of the drone 200 to receive, detect, sense and/or measure a third example acoustic signal 424 arriving at the drone 200 from a third example direction 426 that is generally perpendicular to the second direction 420, and that is generally parallel and opposite to the first direction 414. The fourth acoustic sensor 408 of FIG. 4 is arranged at a fourth example angular position 428 (e.g., two hundred seventy degrees) relative to the center of the drone to receive, detect, sense and/or measure a fourth example acoustic signal 430 arriving at the drone 200 from a fourth example direction 432 that is generally perpendicular to the third direction 426, and that is generally parallel and opposite to the second direction 420.

In the illustrated examples of FIG. 4, respective ones of the first, second, third and fourth acoustic sensors 402, 404, 406, 408 and/or, more generally, the drone 200 of FIG. 4 is/are able to sense, detect and/or measure corresponding respective amplitudes associated with corresponding respective ones of the first, second, third and fourth acoustic signals 412, 418, 424, 430 described above. While the example array of acoustic sensors 206 illustrated in FIG. 4 includes a total of four acoustic sensors, the array of acoustic sensors 206 of FIG. 4 may in other examples include a different number of acoustic sensors (e.g., 2, 3, 6, 8, 24, etc.). The respective orientations, spacings, and/or locations of the acoustic sensors 206 may also differ relative to the specific orientations, spacings, and/or locations shown in the example of FIG. 4.

Figure 5:
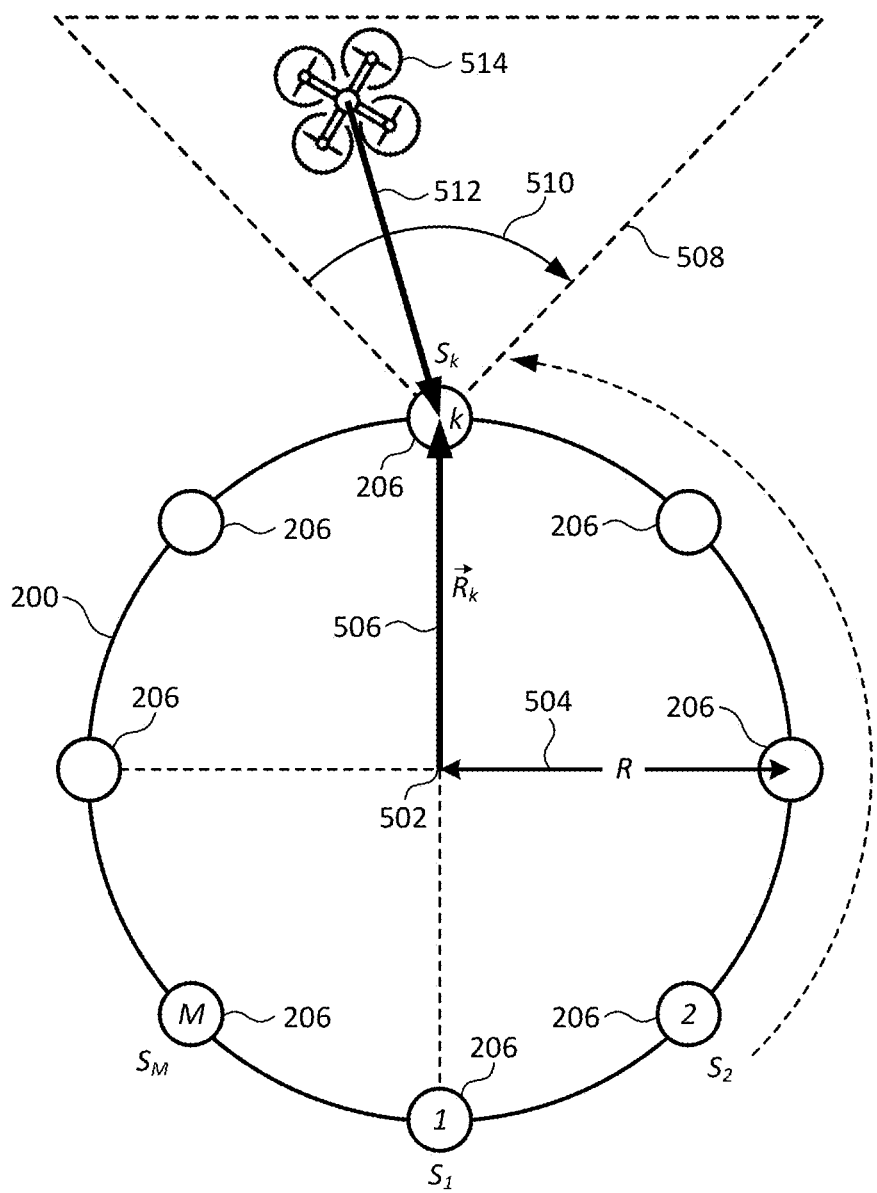
FIG. 5 illustrates another example implementation of the example array of acoustic sensors of FIG. 2 and/or, more generally, the example drone of FIG. 2 receiving and/or detecting example acoustic signals.

FIG. 5 illustrates another example implementation of the example array of acoustic sensors 206 of FIG. 2 and/or, more generally, the example drone 200 of FIG. 2 receiving and/or detecting example acoustic signals. In the illustrated example of FIG. 5, the array of acoustic sensors 206 includes M acoustic sensors that respectively receive, detect, sense and/or measure corresponding input signals $S_1$, $S_2$, ..., $S_k$, ..., $S_M$. In the illustrated example of FIG. 5, M has a value equal to eight (e.g., the array of acoustic sensors 206 includes a total of eight acoustic sensors). In other examples, M may be equal to a different plural number (e.g., 2, 3, 4, 6, 24, etc.). Respective ones of the M acoustic sensors 206 of FIG. 5 are positioned and/or located at corresponding angular positions about an example center 502 of the drone 200. In the illustrated example of FIG. 5, each one of the M acoustic sensors 206 is spaced from the center 502 of the drone 200 by an example radial distance 504 (indicated as "R" in FIG. 5). The acoustic sensor k of FIG. 5 has an example radial position 506 (indicated as "$\vec{R}_k$" in FIG. 5) relative to the center 502 of the drone 200. The acoustic sensor k of FIG. 5 has an associated example field of view 508 defined by an example angle 510. In the illustrated example of FIG. 5, the acoustic sensor k receives, detects, senses and/or measures an example acoustic signal 512 broadcast, emitted and/or transmitted from an example emitter drone 514. In other examples, the acoustic sensor k may additionally or alternatively receive, detect, sense and/or measure one or more other acoustic signal(s) broadcast, emitted and/or transmitted from the emitter drone 514 and/or from one or more other emitter drone(s) located within the field of view 508 of FIG. 5.

Figure 6:
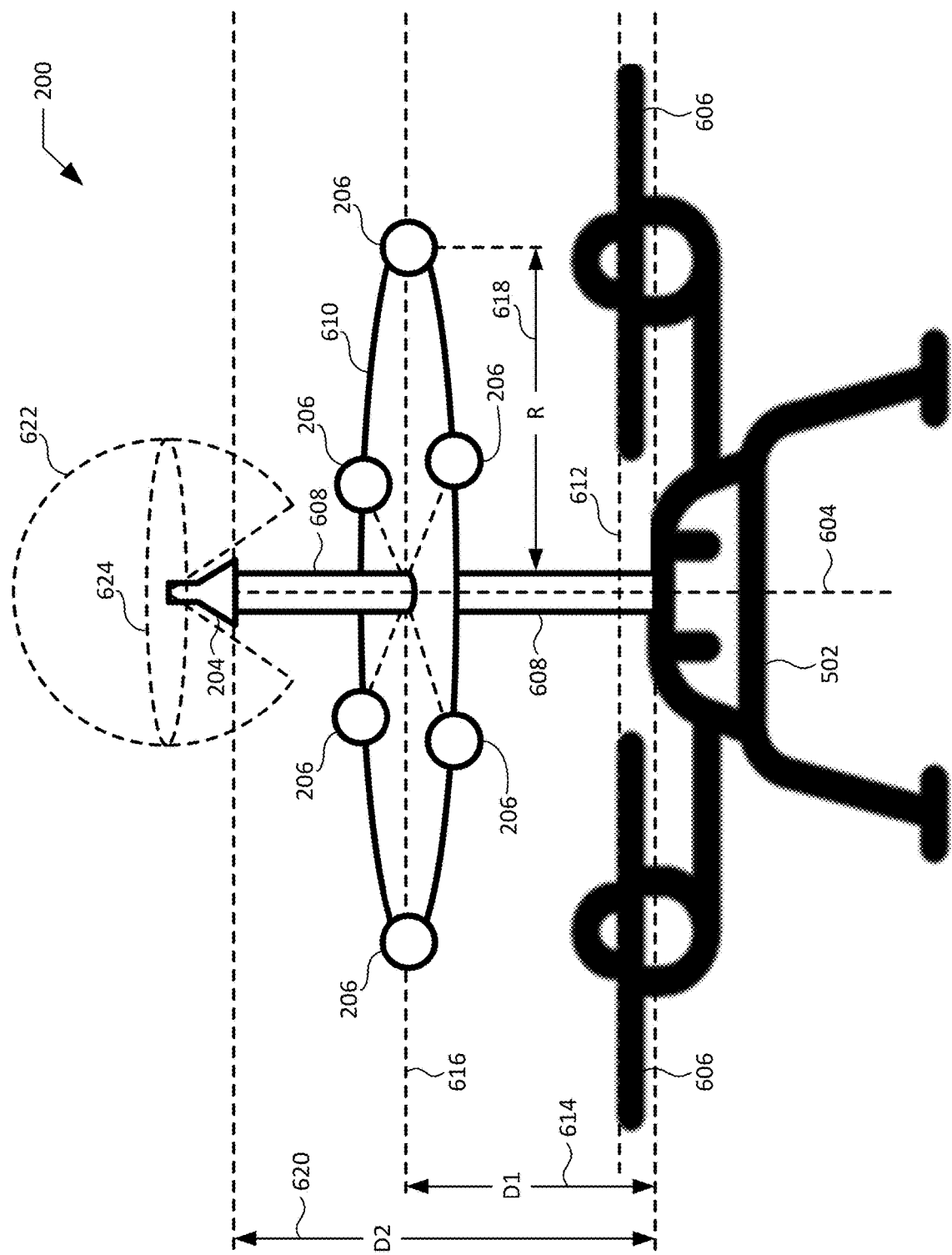
FIG. 6 illustrates an example implementation of the example acoustic transmitter and the example array of acoustic sensors of FIG. 2, and/or more generally, the example drone of FIG. 2.

FIG. 6 illustrates an example implementation of the example acoustic transmitter 204 and the example array of acoustic sensors 206 of FIG. 2, and/or, more generally, the example drone 200 of FIG. 2. In the illustrated example of FIG. 6, the drone 200 includes an example central body 602, an example central axis 604, example propellers 606, an example shaft 608, and an example disc or halo 610. The central axis 604 of FIG. 6 extends through the central body 602. The propellers 606 of FIG. 6 are supported by, carried by, and/or coupled to (e.g., directly or indirectly) the central body 602. The propellers 606 define a first example plane 612 (e.g., a first horizontal plane) that is oriented perpendicular relative to the central axis 604. The shaft 608 of FIG. 6 is supported by, carried by, and/or coupled to (e.g., directly or indirectly) the central body 602. In the illustrated example of FIG. 6, the shaft 608 extends from the central body 602 in a direction that is parallel to the central axis 604 and oriented perpendicular relative to the first plane 612.

The disc or halo 610 of FIG. 6 is supported by, carried by, and/or coupled to (e.g., directly or indirectly) the shaft 608 at a first example distance 614 (indicated as "D1" in FIG. 6) from the central body 602. In the illustrated example of FIG. 6, the disc or halo 610 extends radially from the shaft 608 along a second example plane 616 (e.g., a second horizontal plane) that is oriented perpendicular relative to the central axis 604 and/or the shaft 608, and is further oriented parallel relative to the first plane 612. As shown in the example of FIG. 6, the example array of acoustic sensors 206 includes a total of six acoustic sensors 206 that are supported by, carried by, and/or coupled to (e.g., directly of indirectly) the disc or halo 610 at spaced angular intervals (e.g., equally-spaced sixty degree intervals) about the periphery, perimeter and/or circumference of the disc or halo 610 relative to the central axis 604. In the illustrated example of FIG. 6, the acoustic sensors 206 are arranged such that respective ones of the acoustic sensors 206 are located at an example radial distance 618 (indicated as "R" in FIG. 6) from the central axis 604 and/or the shaft 608. In other examples, the array of acoustic sensors 206 shown in FIG. 6 may include a different number of acoustic sensors (e.g., 2, 3, 4, 8, 24, etc.). The respective orientations, spacings, and/or locations of the acoustic sensors 206 may also differ relative to the specific orientations, spacings, and/or locations shown in the example of FIG. 6.

In the illustrated example of FIG. 6, the acoustic transmitter 204 is supported by, carried by, and or coupled to (e.g., directly or indirectly) the shaft 608 at a second example distance 620 (indicated as "D2" in FIG. 6) from the central body 602 that is greater than the first distance 614. As shown in the example of FIG. 6, the acoustic transmitter 204 broadcasts and/or emits an example acoustic signal 622 (e.g., a spherical acoustic waveform) having an example horizontal wave front 624. In the illustrated example of FIG. 6, the horizontal wave front 624 is substantially parallel relative to the first plane 612 and/or the second plane 616, and has a substantially uniform radial intensity relative to the central axis 604 and/or the shaft 608. In some examples, the acoustic signal broadcast and/or emitted by the acoustic transmitter 204 of FIG. 6 is a spherical acoustic waveform having a substantially equal intensity in all directions, including along the horizontal wave front 624.

Figure 7:
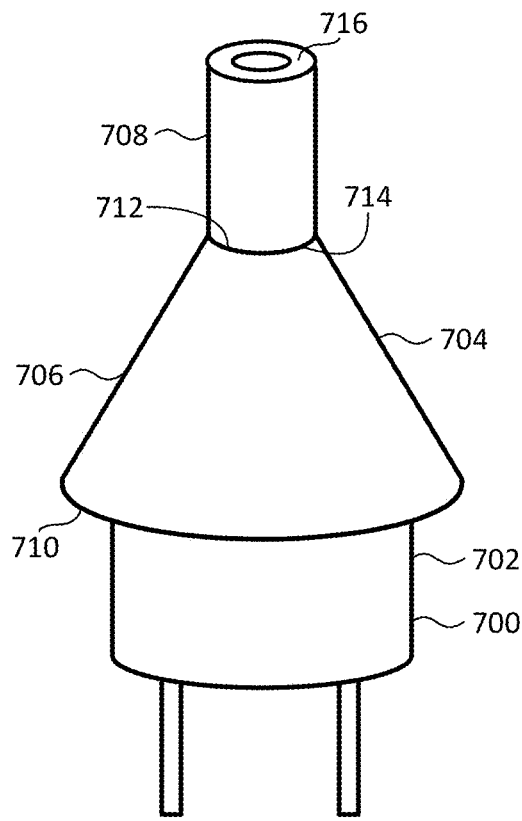
FIG. 7 is a perspective view of an example acoustic transmitter that may be utilized to implement the example acoustic transmitter of FIGS. 2, 3 and/or 6.

FIG. 7 illustrates an example acoustic transmitter 700 that may be utilized to implement the example acoustic transmitter 204 of FIGS. 2, 3 and/or. The acoustic transmitter 700 of FIG. 7 includes an example acoustic transducer 702 and an example case 704 coupled to (e.g., directly or indirectly) the acoustic transducer 702. The example acoustic transducer 702 of FIG. 7 converts electrical signals (e.g., electrical signals generated at the drone 200) into the acoustic signals to be broadcast and/or emitted by the acoustic transmitter 700. In some examples, the electrical signals to be converted into the acoustic signals by the acoustic transducer 702 may be generated by the example signal generator 222 of FIG. 2 described below. In the illustrated example of FIG. 7, the acoustic transducer 702 has a cylindrical shape.

Figure 8:
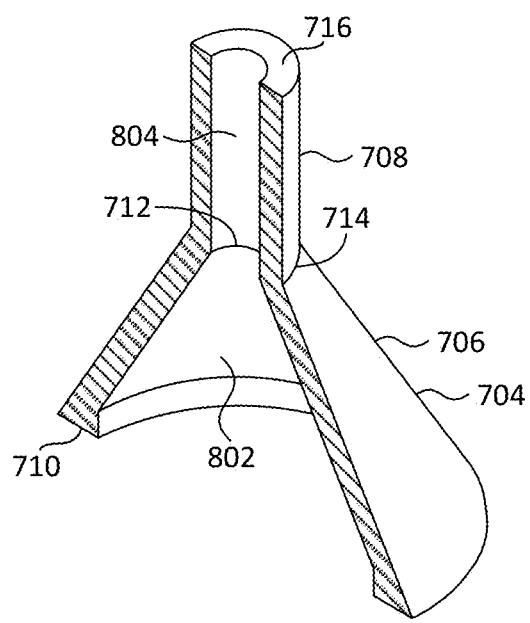
FIG. 8 is a partial cutaway view of the example case of the example acoustic transmitter of FIG. 7.

FIG. 8 is a partial cutaway view of the example case 704 of the example acoustic transmitter 700 of FIG. 7. In the illustrated example of FIGS. 7 and 8, the case 704 is funnel shaped. More specifically, the case 704 includes an example base 706 having a conical shape, and further includes an example stem 708 having a cylindrical shape. The stem 708 is coupled to and/or integrally formed with the base 706. The base 706 of the case 704 of FIGS. 7 and 8 includes a first example end 710 oriented toward the acoustic transducer 702, and a second example end 712 located opposite the first end 710 and oriented away from the acoustic transducer 702. The base 706 further includes an example opening 802 that extends through the base 706 from the first end 710 of the base 706 to the second end 712 of the base 706 in a tapered and/or narrowing manner, as generally defined by the conical shape of the base 706. The stem 708 of the case 704 of FIGS. 7 and 8 includes a first example end 714 oriented toward the base 706, and a second example end 716 located opposite the first end 714 and oriented away from the base 706. The stem 708 further includes an example opening 804 that extends from the first end 714 of the stem 708 to the second end 716 of the stem 708. Acoustic signals broadcast and/or emitted from the acoustic transducer 702 may be funneled and/or channeled from the acoustic transducer 702 into and/or through the opening 802 of the base 706 of the case 704, funneled and/or channeled from the base 706 of the case 704 into and/or through the opening 804 of the stem 708 of the case 704, and broadcast and/or emitted from the opening 804 of the stem 708 of the case 704 into a surrounding airspace (e.g., the airspace 106 of FIG. 1).

FIGS. 9A and 9B illustrate the example case 704 of the example acoustic transmitter 700 of FIGS. 7 and 8 converting an example cylindrical acoustic waveform 902 into an example spherical acoustic waveform 904. As shown in FIG. 9A, the acoustic transducer 702 of the acoustic transmitter 700 broadcasts and/or emits the cylindrical waveform 902. In the absence of the case 704, the cylindrical waveform 902 broadcast and/or emitted by the acoustic transducer 702 will retain a generally cylindrical shape, and accordingly will not have a substantially equal intensity in all directions. As shown in FIG. 9B, the presence and/or inclusion of the case 704 as part of the acoustic transmitter 700 modifies and/or converts the shape of the acoustic signal being broadcast and/or emitted by the acoustic transducer 702. More specifically, the case 704 modifies and/or converts the cylindrical waveform 902 being broadcast and/or emitted by the acoustic transducer 702 into the spherical waveform 904. Unlike the cylindrical waveform 902 of FIG. 9A, the spherical waveform 904 of FIG. 9B advantageously has a substantially equal intensity in all directions. The spherical waveform 904 will accordingly be broadcast and/or emitted by the acoustic transmitter 700 of FIG. 7 in a uniform manner such that other drones in a surrounding airspace have an equal opportunity to receive the broadcast spherical waveform 904 regardless of the direction that such other drones may be located in relative to the acoustic transmitter 700.

Returning to the illustrated example of FIG. 2, the example user interface 208 of FIG. 2 facilitates interactions and/or communications between an end user and the drone 200. The user interface 208 includes one or more input device(s) 214 via which the user may input information and/or data to the drone 200. For example, the user interface 208 may be a button, a switch, a microphone, and/or a touchscreen that enable(s) the user to convey data and/or commands to the example controller 210 of FIG. 2 described below, and/or, more generally, to the drone 200 of FIG. 2. The user interface 208 of FIG. 2 also includes one or more output device(s) 216 via which the user interface 208 presents information and/or data in visual and/or audible form to the user. For example, the user interface 208 may include a light emitting diode, a touchscreen, and/or a liquid crystal display for presenting visual information, and/or a speaker for presenting audible information. Data and/or information that is presented and/or received via the user interface 208 may be of any type, form and/or format, and may be stored in a computer-readable storage medium such as the example memory 212 of FIG. 2 described below.

The example controller 210 of FIG. 2 manages and/or controls the operations of the GPS receiver 202, the acoustic transmitter 204, the array of acoustic sensors 206, the user interface 208, the memory 212, the route manager 218, the collision prevention engine 220 and/or, more generally, the drone 200 of FIG. 2. As mentioned above, the controller 210 of FIG. 2 includes the route manager 218 and the collision prevention engine 220 of FIG. 2, each of which is further described below. The controller 210 of FIG. 2 may be implemented by any type(s) and/or any number(s) of semiconductor device(s) (e.g., microprocessor(s), microcontroller(s), etc.). Control data corresponding to control signal(s), command(s), instruction(s), etc. to be implemented, invoked and/or executed by and/or at the controller 210 may be of any quantity, type, form and/or format, and may be stored in a computer-readable storage medium such as the example memory 212 of FIG. 2 described below.

The example route manager 218 of FIG. 2 manages and/or controls the flight operations of the drone 200 of FIG. 2. For example, the route manager 218 of FIG. 2 may command (e.g., via one or more control signal(s), command(s), instruction(s), etc.) one or more motor(s) and/or propeller(s) of the drone 200 to operate in a manner that causes the drone 200 to follow and/or track a route (e.g., a predetermined route identified by the route manager 218 of FIG. 2, an updated route determined by the collision prevention engine 220 of FIG. 2, etc.). In some examples, the route manager 218 compares the current location of the drone 200 (e.g., as identified and/or derived from the signal(s) collected and/or received by the GPS receiver 202 of FIG. 2) to reference location data (e.g., one or more waypoints) and/or destination location data associated with the route. The reference location data and/or the destination location data may be known to, communicated to, and/or accessed by the route manager 218 and/or, more generally, the drone 200 of FIG. 2. In response to identifying one or more deviation(s) between the compared data, the route manager 218 of FIG. 2 commands one or more motor(s) and/or propeller(s) of the drone 200 to operate in a manner that minimizes, reduces, and/or eliminates the deviation(s) between the compared data, thereby causing the drone 200 to track and/or follow the route.

The route manager 218 of FIG. 2 may be implemented by any type(s) and/or any number(s) of semiconductor device(s) (e.g., microprocessor(s), microcontroller(s), etc.). Route data (e.g., current location data, reference and/or desired location data, reference and/or desired velocity data, reference and/or desired acceleration data, destination data, etc.) corresponding to one or more predetermined and/or updated route(s) to be implemented, invoked and/or processed by and/or at the route manager 218 may be of any quantity, type, form and/or format, and may be stored in a computer-readable storage medium such as the example memory 212 of FIG. 2 described below. Route control data corresponding to control signals, commands, instructions, etc. to be implemented, invoked and/or executed by and/or at the route manager 218 may be of any quantity, type, form and/or format, and may be stored in a computer-readable storage medium such as the example memory 212 of FIG. 2 described below.

The example collision prevention engine 220 of FIG. 2 manages and/or controls the generation and/or execution of collision prevention models that, when implemented, prevent drone-to-drone collision involving the drone 200 of FIG. 2. For example, the collision prevention engine 220 of FIG. 2 may manage and/or control the generation and/or execution of a collision prevention model that determines an updated route for the drone 200 relative to an existing route that the drone 200 may be following and/or tracking, where the existing route would result in a drone-to-drone collision involving the drone 200, and the updated route prevents the drone-to-drone collision from occurring. In some examples, the collision prevention engine 220 instructs the route manager 218 of FIG. 2 described above to follow and/or track an updated route determined by the collision prevention engine 220 instead of a predetermined route that is currently being followed and/or tracked by the drone 200.

As mentioned above, the collision prevention engine 220 of FIG. 2 includes the signal generator 222, the RMS value determiner 224, the force value determiner 226, the model generator 228, and the model operator 230 of FIG. 2, each of which is further described below. The collision prevention engine 220 of FIG. 2 may be implemented by any type(s) and/or any number(s) of semiconductor device(s) (e.g., microprocessor(s), microcontroller(s), etc.). Collision prevention models and/or collision prevention data (e.g., updated route data) executed and/or determined by the collision prevention engine 220 may be of any quantity, type, form and/or format, and may be stored in a computer-readable storage medium such as the example memory 212 of FIG. 2 described below.

The example signal generator 222 of FIG. 2 generates electrical signals to be converted into acoustic signals and/or to be transmitted by the acoustic transmitter 204 of FIG. 2. In some examples, the signal generator 222 may generate a signal for the acoustic transmitter 204 that may be expressed and/or defined as follows:

$$x(t) = A \cdot \text{sign}(\cos(2\pi f t + \delta))  \quad \text{Equation 1:}$$

In Equation 1, the function sgn(.) is negative one (−1) when the argument is negative and positive one (+1) when the argument is positive. Thus, the generated signal x(t) is a square signal of amplitude A with a frequency f and a constant phase δ.

The signal generator 222 of FIG. 2 may be implemented by any type(s) and/or any number(s) of semiconductor device(s) (e.g., microprocessor(s), microcontroller(s), etc.). Signal data (e.g., amplitude data, frequency data, phase data, etc.) generated by the signal generator 222 may be of any quantity, type, form and/or format, and may be stored in a computer-readable storage medium such as the example memory 212 of FIG. 2 described below.

The example RMS value determiner 224 of FIG. 2 determines and/or calculates RMS values associated with the acoustic signals received, detected, sensed and/or measured by and/or at respective ones of the acoustic sensors 206. In some examples, the RMS value determiner 224 may implement and/or execute an RMS value calculation and/or algorithm for respective ones of the acoustic sensors 206 that may be expressed and/or defined as follows:

$$\text{RMS}[S_k] = \sqrt{\frac{1}{T_S} \int_0^{T_S} S_k(t)^2 dt} \quad \text{Equation 2}$$

In Equation 2, $S_k$ is an input signal received, detected, sensed and/or measured by and/or at an acoustic sensor k in an acoustic sensor array (e.g., the acoustic sensor array 206) having M acoustic sensors that respectively receive, detect, sense and/or measure corresponding input signals $S_1$, $S_2$, ..., $S_k$, ..., $S_M$. In some examples, the input signal $S_k$ is a superposition and/or aggregation of multiple input signals received at the acoustic sensor k. In some such examples, the multiple input signals may be received at the acoustic sensor k from multiple other drones. In Equation 2, $T_s$ is a time period over which the acoustic sensor k receives, detects, senses and/or measures the corresponding input signal $S_k$. RMS[$S_k$] is the determined and/or calculated RMS value over the time period $T_s$ for the input signal $S_k$.

The RMS value determiner 224 of FIG. 2 may be implemented by any type(s) and/or any number(s) of semiconductor device(s) (e.g., microprocessor(s), microcontroller(s), etc.). RMS value data determined and/or calculated by the RMS value determiner 224 may be of any quantity, type, form and/or format, and may be stored in a computer-readable storage medium such as the example memory 212 of FIG. 2 described below.

The example force value determiner 226 of FIG. 2 determines and/or calculates force values corresponding to the RMS values determined and/or calculated by the RMS value determiner 224 of FIG. 2. In some examples, the force value determiner 226 may implement and/or execute a force value calculation and/or algorithm for respective ones of the determined RMS values of corresponding ones of the acoustic sensors 206 that may be expressed and/or defined as follows:

$$\vec{F}_k = \frac{\rho_S}{R} \text{RMS}[S_k]^\alpha \vec{R}_k \quad \text{Equation 3}$$

In Equation 3, RMS[$S_k$] is the determined and/or calculated RMS value (e.g., as determined by the application of Equation 2 described above) associated with the input signal $S_k$ and the acoustic sensor k. R is the radial distance from the center of the drone 200 to the acoustic sensor k. $\vec{R}_k$ is the radial position of the acoustic sensor k relative to the center of the drone 200. $\rho_s$ is a design variable having a value less than zero. α is a design variable having a value greater than one. $\vec{F}_k$ is the determined and/or calculated force value for the corresponding RMS value identified as RMS[$S_k$].

The force value determiner 226 of FIG. 2 may be implemented by any type(s) and/or any number(s) of semiconductor device(s) (e.g., microprocessor(s), microcontroller(s), etc.). Force value data determined and/or calculated by the force value determiner 226 may be of any quantity, type, form and/or format, and may be stored in a computer-readable storage medium such as the example memory 212 of FIG. 2 described below.

The example model generator 228 of FIG. 2 generates a collision prevention model based on the force values determined and/or calculated by and/or at the force value determiner 226 of FIG. 2. In some examples, the model generator 228 may generate a collision prevention model that may be expressed and/or defined as follows:

$$\frac{d^2\vec{r}}{dx^2} = \rho_1(\vec{r} - \vec{r}_{ref}) + \rho_2(\vec{r} - \vec{v}_{ref}) + \vec{a}_{ref} + \sum_{k=1}^{M} \vec{F}_k \quad \text{Equation 4}$$

In Equation 4, $\vec{r}$ is the virtual position of the drone 200. $\vec{r}_{ref}$ is the desired position of the drone 200. $\rho_1$ is a design variable having a value less than zero. $\vec{v}_{ref}$ is the desired velocity of the drone 200. $\rho_2$ is a design variable having a value less than zero. $\vec{a}_{ref}$ is the desired acceleration of the drone 200. M is the total number of acoustic sensors in the acoustic sensor array (e.g., the acoustic sensor array 206). $\vec{F}_k$ is the determined and/or calculated force value for the corresponding acoustic sensor k (e.g., as determined by the application of Equation 3 described above).

The model generator 228 of FIG. 2 may be implemented by any type(s) and/or any number(s) of semiconductor device(s) (e.g., microprocessor(s), microcontroller(s), etc.). Collision prevention models and/or collision prevention model data generated by the model generator 228 may be of any quantity, type, form and/or format, and may be stored in a computer-readable storage medium such as the example memory 212 of FIG. 2 described below.

The example model operator 230 of FIG. 2 implements and/or executes collision prevention models generated by and/or at the model generator 228 of FIG. 2 to determine updated routes and/or updated route data (e.g., updated reference locations) for the drone 200 relative to the initial route and/or the initial route data invoked by the route manager. In some examples, the model operator 230 may execute a collision prevention model that may be expressed and/or defined as follows:

$$\vec{r}[n] = 2\vec{r}[n-1] - \vec{r}[n-2] + \quad \text{Equation 5}$$
$$\tau^2 \left( \rho_1(\vec{r} - \vec{r}_{ref}) + \rho_2(\vec{r} - \vec{v}_{ref}) + \vec{a}_{ref} + \sum_{k=1}^{M} \vec{F}_k \right)$$

In Equation 5, $\vec{r}[n]$ is a reference location and/or trajectory for the drone 200. τ is a time step at which the reference location and/or trajectory for the drone 200 is updated, where $\vec{r}[0] = \vec{r}[-1] = \vec{r}_0$, with $\vec{r}_0$ being the initial location of the drone 200. $\vec{r}$ is the virtual position of the drone 200. $\vec{r}_{ref}$ is the desired position of the drone 200. $\rho_1$ is a design variable having a value less than zero. $\vec{v}_{ref}$ is the desired velocity of the drone 200. $\rho_2$ is a design variable having a value less than zero. $\vec{a}_{ref}$ is the desired acceleration of the drone 200. M is the total number of acoustic sensors in the acoustic sensor array (e.g., the acoustic sensor array 206). $\vec{F}_k$ is the determined and/or calculated force value for the corresponding acoustic sensor k (e.g., as determined by the application of Equation 3 described above).

The model operator 230 of FIG. 2 implements and/or executes one or more collision prevention model(s) to determine updated routes and/or updated route data (e.g., updated reference locations) for the drone 200 relative to a previous route (e.g., a predetermined route) and/or previous route data (e.g., predetermined reference locations) invoked and/or processed by the route manager 218 of FIG. 2. In response to the updated route (e.g., updated route data) determined by the model operator 230 of FIG. 2, the route manager 218 commands the drone 200 to follow and/or track the updated route instead of the previous route. By determining the updated route and causing the route manager 218 to command the drone 200 to follow and/or track the updated route instead of the previous route, the model operator 230 and/or, more generally, the collision prevention engine 220 of FIG. 2 advantageously prevent(s) one or more drone-to-drone collisions involving the drone 200 of FIG. 2.

The model operator 230 of FIG. 2 may be implemented by any type(s) and/or any number(s) of semiconductor device(s) (e.g., microprocessor(s), microcontroller(s), etc.). Collision prevention data (e.g., collision prevention model data, updated route data, etc.) corresponding to and/or determined by the collision prevention models implemented and/or executed by the model operator 230 may be of any quantity, type, form and/or format, and may be stored in a computer-readable storage medium such as the example memory 212 of FIG. 2 described below.

The example memory 212 of FIG. 2 may be implemented by any type(s) and/or any number(s) of storage device(s) such as a storage drive, a flash memory, a read-only memory (ROM), a random-access memory (RAM), a cache and/or any other physical storage medium in which information is stored for any duration (e.g., for extended time periods, permanently, brief instances, for temporarily buffering, and/or for caching of the information). The information stored in the memory 212 may be stored in any file and/or data structure format, organization scheme, and/or arrangement.

In some examples, the memory 212 stores route data (e.g., current and/or predetermined route data) invoked and/or processed by and/or at the route manager 218 and/or the controller 210 of FIG. 2. In some examples, the memory 212 stores acoustic signal data corresponding to the acoustic signals to be broadcast and/or emitted by and/or from the acoustic transmitter 204 of FIG. 2. In some examples, the memory 212 stores signal data corresponding to the signals generated by the signal generator 222, the collision prevention engine 220, and/or the controller 210 of FIG. 2. In some examples, the memory 212 stores acoustic signal data received, detected, sensed and/or measured by and/or at the array of acoustic sensors 206 of FIG. 2. In some examples, the memory 212 stores RMS value data determined and/or calculated by and/or at the RMS value determiner 224, the collision prevention engine 220, and/or the controller 210 of FIG. 2. In some examples, the memory 212 stores force value data determined and/or calculated by and/or at the force value determiner 226, the collision prevention engine 220, and/or the controller 210 of FIG. 2. In some examples, the memory 212 stores collision prevention model data generated by and/or at the model generator 228, the collision prevention engine 220, and/or the controller 210 of FIG. 2, and/or executed by the model operator 230, the collision prevention engine 220, and/or the controller 210 of FIG. 2. In some examples, the memory 212 stores updated route data determined by the model operator 230, the collision prevention engine 220, and/or the controller 210 of FIG. 2.

The memory 212 of FIG. 2 is accessible to one or more of the example GPS receiver 202, the example acoustic transmitter 204, the example array of acoustic sensors 206, the example user interface 208 (including the example input device(s) 214 and the example output device(s) 216), and/or the example controller 210 (including the example route manager 218, the example collision prevention engine 220, the example signal generator 222, the example RMS value determiner 226, the example model generator 228, and the example model operator 230) of FIG. 2, and/or, more generally, to the drone 200 of FIG. 2.

In the illustrated example of FIG. 2, the acoustic transmitter 204 and/or the signal generator 222 described above is/are a means to broadcast acoustic signals from the drone 200. The array of acoustic sensors 206 described above is a means to detect acoustic signals broadcast by one or more other drones. The route manager 218 described above is a means to command the drone 200 to track a first route (e.g., a predetermined route). The collision prevention engine 220 described above is a means to determine a second route (e.g., an updated route) based on acoustic signals detected by the array of acoustic sensors 206. The collision prevention engine 220 is also a means to cause the route manager 218 to command the drone to track the second (e.g., updated) route instead of the first (e.g., predetermined) route. The RMS value determiner 224 described above is a means to determine RMS values associated with the acoustic signals detected by the array of acoustic sensors 206. The force value determiner 226 described above is a means to determine force values corresponding to respective ones of the RMS values determined by the RMS value determiner 224. The model generator 228 described above is a means to generate a collision prevention model based on the force values determined by the force value determiner 226. The model operator 230 described above is a means to execute the collision prevention model generated by the model generator 228, and is also a means to determine the second (e.g., updated) route.

While an example manner of implementing the drone 200 is illustrated in FIG. 2, one or more of the elements, processes and/or devices illustrated in FIG. 2 may be combined, divided, re-arranged, omitted, eliminated and/or implemented in any other way. Further, the example GPS receiver 202, the example acoustic transmitter 204, the example array of acoustic sensors 206, the example user interface 208, the example controller 210, the example memory 212, the example input device(s) 214, the example output device(s) 216, the example route manager 218, the example collision prevention engine 220, the example signal generator 222, the example RMS value determiner 224, the example force value determiner 226, the example model generator 228, the example model operator 230 and/or, more generally, the example drone 200 of FIG. 2 may be implemented by hardware, software, firmware and/or any combination of hardware, software and/or firmware. Thus, for example, any of the example GPS receiver 202, the example acoustic transmitter 204, the example array of acoustic sensors 206, the example user interface 208, the example controller 210, the example memory 212, the example input device(s) 214, the example output device(s) 216, the example route manager 218, the example collision prevention engine 220, the example signal generator 222, the example RMS value determiner 224, the example force value determiner 226, the example model generator 228, the example model operator 230 and/or, more generally, the example drone 200 of FIG. 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example GPS receiver 202, the example acoustic transmitter 204, the example array of acoustic sensors 206, the example user interface 208, the example controller 210, the example memory 212, the example input device(s) 214, the example output device(s) 216, the example route manager 218, the example collision prevention engine 220, the example signal generator 222, the example RMS value determiner 224, the example force value determiner 226, the example model generator 228, and/or the example model operator 230 of FIG. 2 is/are hereby expressly defined to include a non-transitory computer readable storage device or storage disk such as a memory, a digital versatile disk (DVD), a compact disk (CD), a Blu-ray disk, etc. including the software and/or firmware. Further still, the example GPS receiver 202, the example acoustic transmitter 204, the example array of acoustic sensors 206, the example user interface 208, the example controller 210, the example memory 212, the example input device(s) 214, the example output device(s) 216, the example route manager 218, the example collision prevention engine 220, the example signal generator 222, the example RMS value determiner 224, the example force value determiner 226, the example model generator 228, the example model operator 230 and/or, more generally, the example drone 200 of FIG. 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 10:
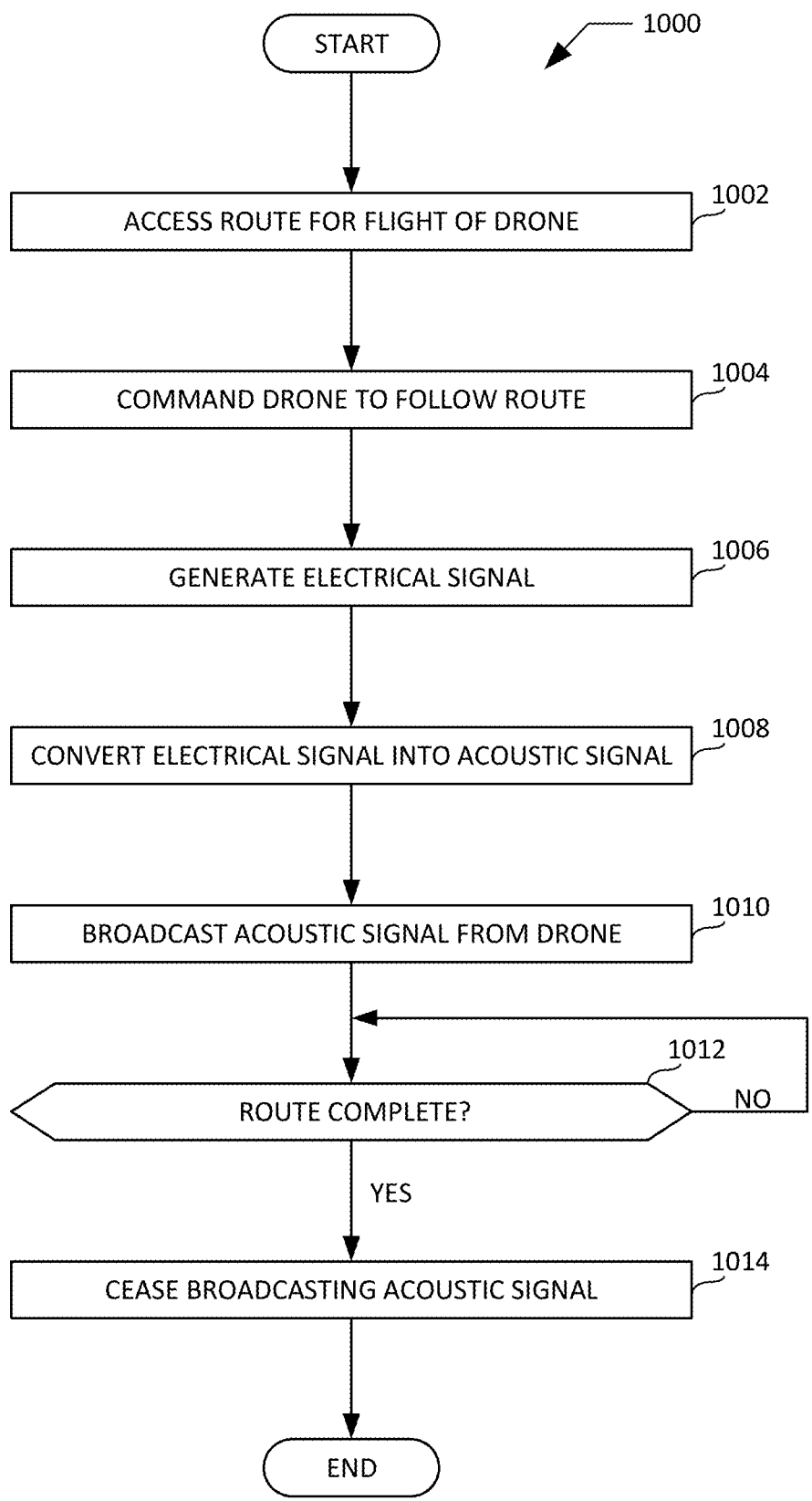
FIG. 10 is a flowchart representative of example machine readable instructions that may be executed to implement the example drone of FIG. 2 to broadcast an acoustic signal from the example drone of FIG. 2 to one or more other drone(s).
Figure 11:
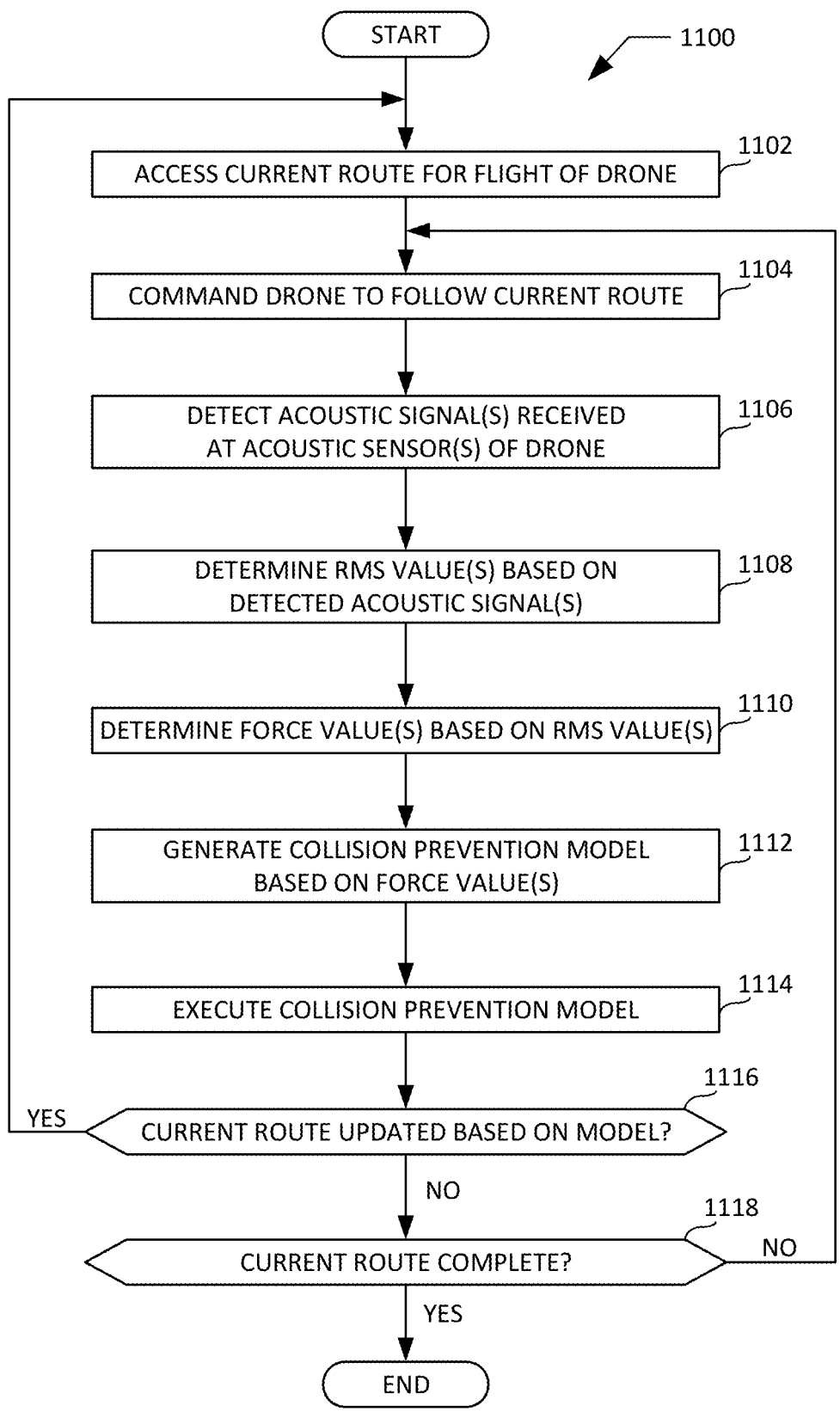
FIG. 11 is a flowchart representative of example machine readable instructions that may be executed to implement the example drone of FIG. 2 to prevent collisions between the example drone of FIG. 2 and one or more other drone(s) based on acoustic signals received at the example drone of FIG. 2 from the one or more other drone(s).

Flowcharts representative of example hardware logic, machine readable instructions, hardware implemented state machines, and/or any combination thereof for implementing the drone 200 of FIG. 2 are shown in FIGS. 10 and 11. The machine readable instructions may be one or more executable program(s) or portion(s) of executable program(s) for execution by a computer processor such as the processor (e.g., implemented as the example controller 210 of FIG. 2) shown in the example processor platform 1200 discussed below in connection with FIG. 12. The program(s) may be embodied in software stored on a non-transitory computer readable storage medium such as a CD-ROM, a floppy disk, a hard drive, a DVD, a Blu-ray disk, or a memory associated with the processor and/or controller 210, but the entire program(s) and/or parts thereof could alternatively be executed by a device other than the processor and/or controller 210 and/or embodied in firmware or dedicated hardware. Further, although the example program(s) is/are described with reference to the flowcharts illustrated in FIGS. 10 and/or 11, many other methods of implementing the example drone 200 of FIG. 2 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 10 and/or 11 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least A, (2) at least B, and (3) at least A and at least B. Similarly, as used herein in the context of describing structures, components, items, objects and/or things, the phrase "at least one of A or B" is intended to refer to implementations including any of (1) at least A, (2) at least B, and (3) at least A and at least B. As used herein in the context of describing the performance or execution of processes, instructions, actions, activities and/or steps, the phrase "at least one of A and B" is intended to refer to implementations including any of (1) at least A, (2) at least B, and (3) at least A and at least B. Similarly, as used herein in the context of describing the performance or execution of processes, instructions, actions, activities and/or steps, the phrase "at least one of A or B" is intended to refer to implementations including any of (1) at least A, (2) at least B, and (3) at least A and at least B.

FIG. 10 is a flowchart representative of example machine readable instructions 1000 that may be executed to implement the example drone 200 of FIG. 2 to broadcast an acoustic signal from the example drone 200 of FIG. 2 to one or more other drone(s). The example program 1000 begins when the example route manager 218 of FIG. 2 accesses, obtains and/or receives a route (e.g., route data) for a flight of the drone 200 of FIG. 2 (block 1002). For example, the route manager 218 may access, obtain and/or receive a route for a flight of the drone 200 from the example memory 212 of FIG. 2 or from the example user interface 208 of FIG. 2. Following block 1002, control of the example program 1000 of FIG. 10 proceeds to block 1004.

At block 1004, the example route manager 218 of FIG. 2 commands the drone 200 to follow the route (block 1004). For example, the route manager 218 may compare a current location of the drone 200 to reference location data and/or destination location data associated with the route. In response to identifying one or more deviation(s) between the compared data, the route manager 218 may command one or more motor(s) and/or propeller(s) of the drone 200 to operate in a manner that minimizes, reduces, and/or eliminates the deviation(s) between the compared data, thereby causing the drone 200 to track and/or follow the route. Following block 1004, control of the example program 1000 of FIG. 10 proceeds to block 1006.

At block 1006, the example signal generator 222 of FIG. 2 generates an electrical signal (block 1006). For example, the signal generator 222 of FIG. 2 may generate an electrical signal having the form of Equation 1 described above. Following block 1006, control of the example program 1000 of FIG. 10 proceeds to block 1008.

At block 1008, the example acoustic signal transmitter 204 of FIG. 2 converts the electrical signal into an acoustic signal (block 1008). For example, the acoustic signal transmitter 204 may convert the electrical signal into an acoustic signal via the example acoustic transducer 702 of FIGS. 7, 8, 9A and 9B. Following block 1008, control of the example program 1000 of FIG. 10 proceeds to block 1010.

At block 1010, the example acoustic signal transmitter 204 of FIG. 2 broadcasts and/or emits the acoustic signal (block 1010). For example, the acoustic signal transmitter 204 may broadcast and/or emit the acoustic signal from the drone 200 to one or more other drone(s). Following block 1010, control of the example program 1000 of FIG. 10 proceeds to block 1012.

At block 1012, the example route manager 218 of FIG. 2 determines whether the route is complete (block 1012). For example, the route manager 218 may compare a current location of the drone 200 to a destination location associated with the route to determine whether the drone 200 has reached the destination location. If the route manager 218 determines at block 1012 that the route is not complete, control of the example program 1000 of FIG. 10 remains at block 1012. If the route manager 218 instead determines at block 1012 that the route is complete, control of the example program 1000 of FIG. 10 proceeds to block 1014.

At block 1014, the example acoustic transmitter 204 of FIG. 2 ceases the broadcasting of the acoustic signal (block 1014). For example, the acoustic transmitter 204 may cease broadcasting the acoustic signal in response to a termination of the electrical signal generated by the example signal generator 222 of FIG. 2, as may be instructed and/or commanded by the example controller 210 of FIG. 2. Following block 1014, the example program 1000 of FIG. 10 ends.

FIG. 11 is a flowchart representative of example machine readable instructions 1100 that may be executed to implement the example drone 200 of FIG. 2 to prevent collisions between the example drone 200 of FIG. 2 and one or more other drone(s) based on acoustic signals received at the example drone 200 of FIG. 2 from the one or more other drone(s). The example program 1100 begins when the example route manager 218 of FIG. 2 accesses, obtains and/or receives a current route (e.g., current route data) for a flight of the drone 200 of FIG. 2 (block 1102). For example, the route manager 218 may access, obtain and/or receive a first route (e.g., a predetermined route) for a flight of the drone 200 from the example memory 212 of FIG. 2 or from the example user interface 208 of FIG. 2. Following block 1102, control of the example program 1100 of FIG. 11 proceeds to block 1104.

At block 1104, the example route manager 218 of FIG. 2 commands the drone 200 to follow the current route (block 1104). For example, the route manager 218 may compare a current location of the drone 200 to reference location data and/or destination location data associated with the current (e.g., first) route. In response to identifying one or more deviation(s) between the compared data, the route manager 218 may command one or more motor(s) and/or propeller(s) of the drone 200 to operate in a manner that minimizes, reduces, and/or eliminates the deviation(s) between the compared data, thereby causing the drone 200 to track and/or follow the current (e.g., first) route. Following block 1104, control of the example program 1100 of FIG. 11 proceeds to block 1106.

At block 1106, respective ones of the acoustic sensors of the example array of acoustic sensors 206 of FIG. 2 receive, detect, sense and/or measure one or more corresponding respective acoustic signal(s) (block 1106). For example, the respective ones of the acoustic sensors 206 of FIG. 2 may receive, detect, sense and/or measure one or more corresponding respective acoustic signal(s) from one or more other drone(s) while the drone 200 is following and/or tracking the current (e.g., first) route. Following block 1106, control of the example program 1100 of FIG. 11 proceeds to block 1108.

At block 1108, the example RMS value determiner 224 of FIG. 2 determines and/or calculates one or more RMS value(s) based on and/or corresponding to the acoustic signals received, detected, sensed and/or measured by and/or at the respective ones of the acoustic sensors 206 of FIG. 2 (block 1108). For example, the RMS value determiner 224 may implement and/or execute an RMS value calculation and/or algorithm for respective ones of the acoustic sensors 206 that may be expressed and/or defined according to Equation 2 described above. Following block 1108, control of the example program 1100 of FIG. 11 proceeds to block 1110.

At block 1110, the example force value determiner 226 of FIG. 2 determines and/or calculates one or more force value(s) based on and/or corresponding to respective ones of the RMS values determined by the RMS value determiner 224 of FIG. 2 (block 1110). For example, the force value determiner 226 may implement and/or execute a force value calculation and/or algorithm for respective ones of the determined RMS values of corresponding ones of the acoustic sensors 206 of FIG. 2 that may be expressed and/or defined according to Equation 3 described above. Following block 1110, control of the example program 1100 of FIG. 11 proceeds to block 1112.

At block 1112, the example model generator 228 of FIG. 2 generates a collision prevention model based on and/or corresponding to respective ones of the force values determined by the force value determiner 226 of FIG. 2 (block 1112). For example, the model generator 228 may generate a collision prevention model that may be expressed and/or defined according to Equation 4 described above. Following block 1112, control of the example program 1100 of FIG. 11 proceeds to block 1114.

At block 1114, the example model operator 230 of FIG. 2 implements and/or executes the collision prevention model generated by the model generator 228 of FIG. 2 (block 1114). For example, the model operator 230 may implement and/or execute a collision prevention model that may be expressed and/or defined according to Equation 5 described above. Following block 1114, control of the example program 1100 of FIG. 11 proceeds to block 1116.

At block 1116, the example route manager 218 of FIG. 2 determines whether the current (e.g. first) route being followed and/or tracked by the drone 200 has been updated based on the execution of the collision prevention model (block 1116). For example, the execution of the collision prevention model by the model operator 230 of FIG. 2 at block 1114 described above may cause the model operator 230 to determine an updated (e.g., second) route for the drone 200 relative to the current (e.g., first) route. The route manager 218 may receive a command, instruction and/or notification indicating that the model operator 230 of FIG. 2 has determined the updated (e.g., second) data. If the route manager 218 determines at block 1116 that the current (e.g., first) route has been updated based on the execution of the collision prevention model, control of the example program 1100 of FIG. 11 returns to block 1102, where the route manager 218 accesses and/or obtains the updated (e.g., second) route as the current route, and the above-described operations of blocks 1104 through 1114 are repeated based on the updated (e.g., second) route being the current route. If the route manager 218 instead determines at block 1116 that the current (e.g., first) route has not been updated based on the execution of the collision prevention model, control of the example program 1100 of FIG. 11 proceeds to block 1118.

At block 1118, the example route manager 218 of FIG. 2 determines whether the current route is complete (block 1118). For example, the route manager 218 may compare a current location of the drone 200 to a destination location associated with the current route (e.g., the first route or, if the first route has been updated, the second route) to determine whether the drone 200 has reached the destination location. If the route manager 218 determines at block 1118 that the current route is not complete, control of the example program 1100 of FIG. 11 returns to block 1104. If the route manager 218 instead determines at block 1118 that the current route is complete, the example program 1100 of FIG. 11 ends.

Figure 12:
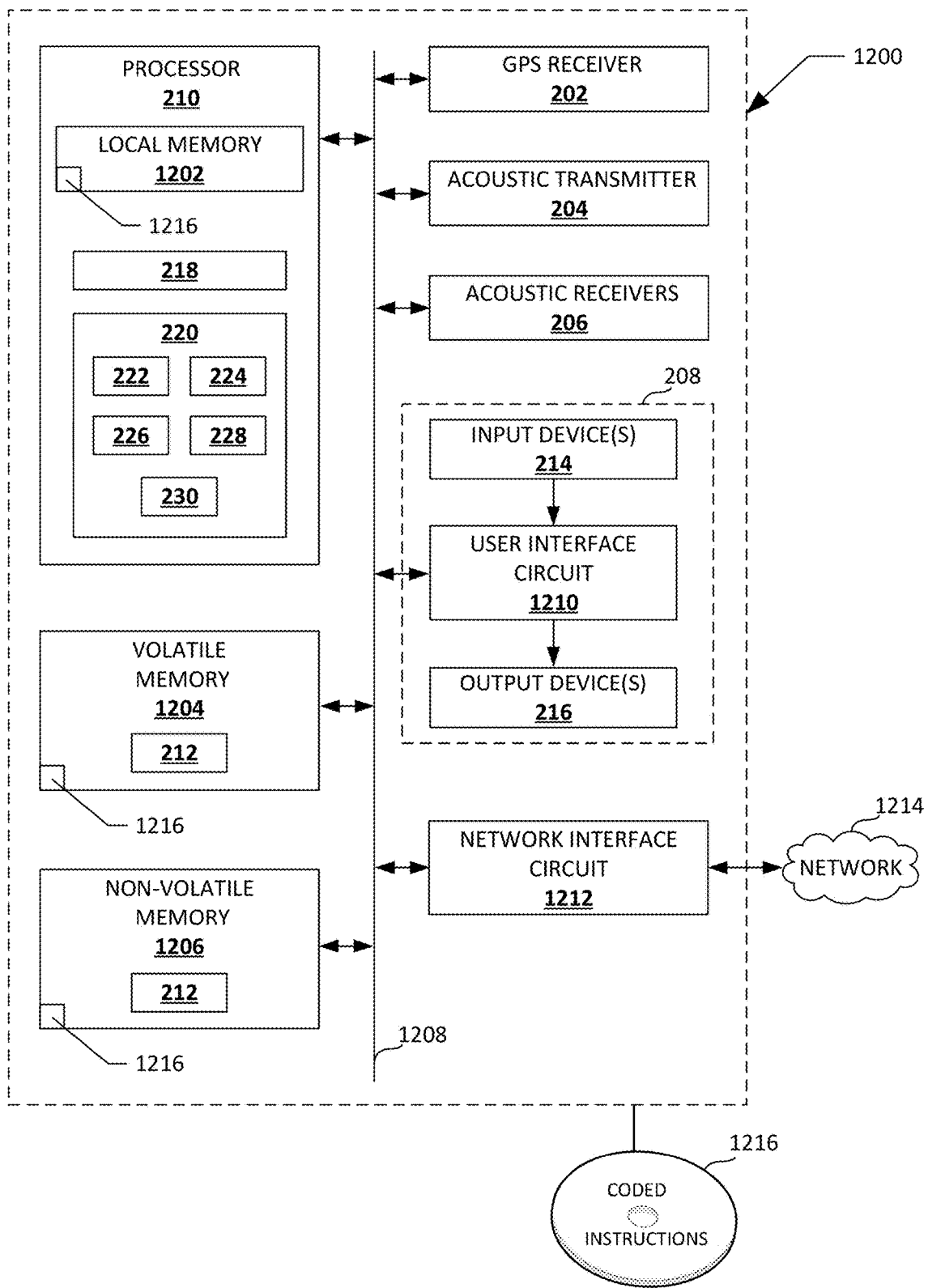
FIG. 12 is a block diagram of an example processor platform structured to execute the example instructions of FIG. 10 and/or the example instructions of FIG. 11 to implement the example drone of FIG. 2.

FIG. 12 is a block diagram of an example processor platform 1200 structured to execute the example instructions 1000 of FIG. 10 and/or the example instructions 1100 of FIG. 11 to implement the example drone 200 of FIG. 2. The processor platform 1200 of the illustrated example includes a processor implemented as the example controller 210 of FIG. 2. The controller 210 of the illustrated example is hardware. For example, the controller 210 can be implemented by one or more integrated circuits, logic circuits, microprocessors, GPUs, DSPs, or controllers from any desired family or manufacturer. The hardware controller may be a semiconductor based (e.g., silicon based) device. In this example, the controller 210 implements the example route manager 218, the example collision prevention engine 220, the example signal generator 222, the example RMS value determiner 224, the example force value determiner 226, the example model generator 228, and the example model operator 230 of FIG. 2.

The controller 210 of the illustrated example includes a local memory 1202 (e.g., a cache). The controller 210 is in communication with a main memory including a volatile memory 1204 and a non-volatile memory 1206 via a bus 1208. The volatile memory 1204 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1206 may be implemented by flash memory and/or any other desired type of memory device. Access to the main memory 1204, 1206 is controlled by a memory controller. In the illustrated example of FIG. 12, one or both of the volatile memory 1204 and/or the non-volatile memory 1206 implement(s) the example memory 212 of FIG. 2.

The controller 210 of the illustrated example is in communication with the example GPS receiver 202, the example acoustic transmitter 204, and the example array of acoustic sensors 206 of FIG. 2 via the bus 1208.

The processor platform 1200 of the illustrated example also includes a user interface circuit 1210. The user interface circuit 1210 may be implemented by any type of interface standard, such as an Ethernet interface, a universal serial bus (USB), a Bluetooth® interface, a near field communication (NFC) interface, and/or a PCI express interface. In the illustrated example, one or more input device(s) 214 are connected to the user interface circuit 1210. The input device(s) 214 permit(s) a user to enter data and/or commands into the controller 210. The input device(s) 214 can be implemented by, for example, an audio sensor, a microphone, a camera (still or video), a keyboard, a button, a mouse, a touchscreen, a track-pad, a trackball, isopoint and/or a voice recognition system. One or more output device(s) 216 are also connected to the user interface circuit 1210 of the illustrated example. The output device(s) 216 can be implemented, for example, by display devices (e.g., a light emitting diode (LED), an organic light emitting diode (OLED), a liquid crystal display (LCD), a touchscreen, etc.), a tactile output device, and/or a speaker. The user interface circuit 1210 of the illustrated example, thus, typically includes a graphics driver card, a graphics driver chip and/or a graphics driver processor. In the illustrated example, the input device(s) 214, the output device(s) 216, and the user interface circuit 1210 collectively implement the example user interface 208 of FIG. 2.

The processor platform 1200 of the illustrated example also includes a network interface circuit 1212. The network interface circuit 1212 may be implemented by any type of interface standard, such as an Ethernet interface, a universal serial bus (USB), a Bluetooth® interface, a near field communication (NFC) interface, and/or a PCI express interface. The network interface circuit 1212 may include a radio transmitter, a radio receiver, and/or a radio transceiver to facilitate the exchange of data and/or signals with external machines (e.g., a server, other drones, etc.) via a network 1214 (e.g., a cellular network, a wireless local area network (WLAN), etc.).

Coded instructions 1216 including the machine executable instructions 1000 of FIG. 10 and/or the machine executable instructions 1100 of FIG. 11 may be stored in the local memory 1202, in the volatile memory 1204, in the non-volatile memory 1206, and/or on a removable non-transitory computer readable storage medium such as a flash memory stick, a CD, or a DVD.

From the foregoing, it will be appreciated that methods and apparatus have been disclosed for preventing collisions between drones based on drone-to-drone acoustic communications. In some disclosed example methods and apparatus, a drone traveling through and/or within an airspace receives acoustic signals (e.g., ultrasonic acoustic signals) from one or more other drone(s) traveling through and/or within the airspace. In some disclosed example methods and apparatus, the drone accounts for (e.g., in real time or near real time) the location(s) of the other drone(s), based on the received acoustic signals, while the drone is following and/or tracking a predetermined (e.g., first) route. In some disclosed example methods and apparatus, the drone includes a collision prevention engine that, based on the received acoustic signals, determines an updated (e.g., second) route to be followed and/or tracked by the drone to prevent a drone-to-drone collision involving the drone and at least one of the one or more other drone(s). In some disclosed example methods and apparatus, the collision prevention engine causes the drone to follow and/or track the updated (e.g., second) route instead of the predetermined (e.g., first) route. In some disclosed example methods and apparatus, the drone broadcasts an acoustic signal of its own to at least one of the one or more other drone(s), thereby facilitating an exchange of drone-to-drone acoustic communications between and/or among respective ones of the drones that may be traveling through and/or within the airspace. The use of drone-to-drone acoustic (e.g., ultrasonic) communications by the example methods and apparatus disclosed herein advantageously eliminates any need for the external infrastructures, external anchors, costly on-board sensors, and/or complex visual and/or positional recognition algorithms required by the known methods and systems for preventing drone-to-drone collisions described above. The use of drone-to-drone acoustic (e.g., ultrasonic) communications by the example methods and apparatus disclosed herein is also more efficient battery-wise, requires less spectrum allocation, and is less prone to interference compared to the use of radio communications.

In some examples, a control system of a first drone is disclosed. In some disclosed examples, the control system comprises a route manager, a plurality of acoustic sensors, and a collision prevention engine. In some disclosed examples, the route manager is to command the first drone to track a first route. In some disclosed examples, the acoustic sensors are arranged on the first drone to detect acoustic signals. In some disclosed examples, the collision prevention engine is to determine a second route based on acoustic signals detected by the acoustic sensors. In some disclosed examples, the acoustic signals are received from a second drone while the first drone is tracking the first route. In some disclosed examples, the second route differs from the first route to prevent a drone-to-drone collision between the first drone and the second drone. In some disclosed examples, the collision prevention engine is to cause the route manager to command the first drone to track the second route instead of the first route.

In some disclosed examples, the collision prevention engine includes a root mean square (RMS) value determiner to determine RMS values associated with the acoustic signals detected by respective ones of the acoustic sensors. In some disclosed examples, the collision prevention engine further includes a force value determiner to determine force values corresponding to respective ones of the RMS values.

In some disclosed examples, the collision prevention engine further includes a model generator to generate a collision prevention model based on the force values. In some disclosed examples, the collision prevention engine further includes a model operator to execute the collision prevention model. In some disclosed examples, the second route is to be determined in response to execution of the collision prevention model.

In some disclosed examples, respective ones of the acoustic signals detected by the acoustic sensors of the array are ultrasonic acoustic signals.

In some disclosed examples, respective ones of the acoustic sensors are directional microphones.

In some disclosed examples, respective ones of the acoustic sensors are arranged at different angular positions about a central axis of the first drone.

In some disclosed examples, the respective ones of the acoustic sensors are arranged along a plane that is perpendicular to the central axis.

In some disclosed examples, the control system further includes an acoustic transmitter to broadcast an acoustic signal from the first drone while the first drone is tracking at least one of the first route or the second route. In some disclosed examples, the acoustic transmitter is a speaker, and the acoustic signal to be broadcast by the acoustic transmitter is an ultrasonic acoustic signal.

In some disclosed examples, the acoustic transmitter includes an acoustic transducer to convert an electrical signal generated at the first drone into the acoustic signal to be broadcast by the acoustic transmitter. In some disclosed examples, the acoustic transmitter further includes a funnel-shaped case coupled to the acoustic transducer. In some disclosed examples, the funnel-shaped case is to modify a shape of the acoustic signal to be broadcast by the acoustic transmitter.

In some disclosed examples, the funnel-shaped case is to convert the acoustic signal to be broadcast by the acoustic transmitter from a cylindrical waveform into a spherical waveform.

In some examples, a non-transitory computer-readable storage medium comprising instructions is disclosed. In some disclosed examples, the instructions, when executed, cause one or more processors of a first drone to command the first drone to track a first route. In some disclosed examples, the instructions, when executed, further cause the one or more processors of the first drone to determine a second route based on acoustic signals detected by acoustic sensors of the first drone. In some disclosed examples, the acoustic signals are received from a second drone while the first drone is tracking the first route. In some disclosed examples, the second route differs from the first route to prevent a drone-to-drone collision between the first drone and the second drone. In some disclosed examples, the instructions, when executed, further cause the one or more processors of the first drone, in response to determining the second route, to command the first drone to track the second route instead of the first route.

In some disclosed examples, the instructions, when executed, further cause the one or more processors of the first drone to determine root mean square (RMS) values associated with the acoustic signals detected by respective ones of the acoustic sensors. In some disclosed examples, the instructions, when executed, further cause the one or more processors of the first drone to determine force values corresponding to respective ones of the RMS values. In some disclosed examples, the instructions, when executed, further cause the one or more processors of the first drone to generate a collision prevention model based on the force values. In some disclosed examples, the instructions, when executed, further cause the one or more processors of the first drone to execute the collision prevention model. In some disclosed examples, the second route is to be determined in response to execution of the collision prevention model.

In some disclosed examples, respective ones of the acoustic signals detected by the acoustic sensors are ultrasonic acoustic signals.

In some disclosed examples, respective ones of the acoustic sensors are directional microphones.

In some disclosed examples, respective ones of the acoustic sensors are arranged on the first drone at different angular positions about a central axis of the first drone.

In some disclosed examples, the respective ones of the acoustic sensors are arranged along a plane that is perpendicular to the central axis.

In some disclosed examples, the instructions, when executed, further cause the one or more processors of the first drone to broadcast, via an acoustic transmitter of the first drone, an acoustic signal from the first drone while the first drone is tracking at least one of the first route or the second route.

In some disclosed examples, the acoustic transmitter is a speaker, and the acoustic signal to be broadcast by the acoustic transmitter is an ultrasonic acoustic signal.

In some disclosed examples, the acoustic transmitter includes an acoustic transducer to convert an electrical signal generated at the first drone into the acoustic signal to be broadcast by the acoustic transmitter. In some disclosed examples, the acoustic transmitter further includes a funnel-shaped case coupled to the acoustic transducer. In some disclosed examples, the funnel-shaped case is to modify a shape of the acoustic signal to be broadcast by the acoustic transmitter.

In some disclosed examples, the funnel-shaped case is to convert the acoustic signal to be broadcast by the acoustic transmitter from a cylindrical waveform into a spherical waveform.

In some examples, a method is disclosed. In some disclosed examples, the method comprises commanding a first drone to track a first route by executing a computer-readable instruction with one or more processors of the first drone. In some disclosed example, the method further comprises determining, by executing a computer-readable instruction with the one or more processors of the first drone, a second route based on acoustic signals detected by acoustic sensors of the first drone. In some disclosed examples, the acoustic signals are received from a second drone while the first drone is tracking the first route. In some disclosed examples, the second route differs from the first route to prevent a drone-to-drone collision between the first drone and the second drone. In some disclosed examples, the method further comprises, in response to the determining of the second route, commanding the first drone to track the second route instead of the first route by executing a computer-readable instruction with the one or more processors of the first drone.

In some disclosed examples, the method further includes determining, by executing a computer-readable instruction with the one or more processors of the first drone, root mean square (RMS) values associated with the acoustic signals detected by respective ones of the acoustic sensors. In some disclosed examples, the method further includes determining, by executing a computer-readable instruction with the one or more processors of the first drone, force values corresponding to respective ones of the RMS values. In some disclosed examples, the method further includes generating, by executing a computer-readable instruction with the one or more processors of the first drone, a collision prevention model based on the force values. In some disclosed examples, the method further includes executing the collision prevention model by executing a computer-readable instruction with the one or more processors of the first drone. In some disclosed examples, the second route is to be determined in response to the executing of the collision prevention model.

In some disclosed example, respective ones of the acoustic signals detected by the acoustic sensors are ultrasonic acoustic signals.

In some disclosed examples, respective ones of the acoustic sensors are directional microphones.

In some disclosed examples, respective ones of the acoustic sensors are arranged on the first drone at different angular positions about a central axis of the first drone.

In some disclosed examples, the respective ones of the acoustic sensors are arranged along a plane that is perpendicular to the central axis.

In some disclosed examples, the method further includes broadcasting, via an acoustic transmitter of the first drone, an acoustic signal from the first drone while the first drone is tracking at least one of the first route or the second route.

In some disclosed examples, the acoustic transmitter is a speaker, and the broadcasting of the acoustic signal includes broadcasting the acoustic signal as an ultrasonic acoustic signal.

In some disclosed examples, the broadcasting of the acoustic signal includes converting, via an acoustic transducer of the acoustic transmitter, an electrical signal generated at the first drone into the acoustic signal to be broadcast by the acoustic transmitter. In some disclosed examples, the broadcasting of the acoustic signal further includes modifying, via a funnel-shaped case coupled to the acoustic transducer, a shape of the acoustic signal to be broadcast by the acoustic transmitter.

In some disclosed examples, the modifying includes converting, via the funnel-shaped case, the shape of the acoustic signal to be broadcast by the acoustic transmitter from a cylindrical waveform into a spherical waveform.

In some examples, a control system of a first drone is disclosed. In some disclosed examples, the control system comprises route managing means for commanding the first drone to track a first route. In some disclosed examples, the control system further comprises signal detecting means arranged to detect acoustic signals. In some disclosed examples, the control system further comprises collision prevention means for determining a second route based on acoustic signals detected by the signal detecting means. In some disclosed examples, the acoustic signals are received from a second drone while the first drone is tracking the first route. In some disclosed examples, the second route differs from the first route to prevent a drone-to-drone collision between the first drone and the second drone. In some disclosed examples, the collision prevention means is to cause the route managing means to command the first drone to track the second route instead of the first route.

In some disclosed examples, the collision prevention means includes root mean square (RMS) value determining means for determining RMS values associated with the acoustic signals detected by the signal detecting means. In some disclosed examples, the collision prevention means further includes force value determining means for determining force values corresponding to respective ones of the RMS values. In some disclosed examples, the collision prevention means further includes model generating means for generating a collision prevention model based on the force values. In some disclosed examples, the collision prevention means further includes model operating means for executing the collision prevention model. In some disclosed examples, the second route is to be determined in response to execution of the collision prevention model.

In some disclosed examples, respective ones of the acoustic signals detected by the signal detecting means are ultrasonic acoustic signals.

In some disclosed examples, the signal detecting means includes a plurality of directional microphones.

In some disclosed examples, the signal detecting means includes a plurality of acoustic sensors arranged on the first drone at different angular positions about a central axis of the first drone.

In some disclosed examples, respective ones of the acoustic sensors are arranged along a plane that is perpendicular to the central axis.

In some disclosed examples, the control system further includes a signal transmitting means for broadcasting an acoustic signal from the first drone while the first drone is tracking at least one of the first route or the second route. In some disclosed examples, the signal transmitting means includes a speaker, and the acoustic signal to be broadcast by the signal transmitting means is an ultrasonic acoustic signal.

In some disclosed examples, the signal transmitting means includes an acoustic transducer to convert an electrical signal generated at the first drone into the acoustic signal to be broadcast by the signal transmitting means. In some disclosed examples, the signal transmitting means further includes a funnel-shaped case coupled to the acoustic transducer. In some disclosed examples, the funnel-shaped case is to modify a shape of the acoustic signal to be broadcast by the signal transmitting means.

In some disclosed examples, the funnel-shaped case is to convert the acoustic signal to be broadcast by the signal transmitting means from a cylindrical waveform into a spherical waveform.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A control system of a first drone, the control system comprising:
   a route manager to command the first drone to track a first route;
   a plurality of acoustic sensors coupled to a disc of the first drone, the acoustic sensors arranged at intervals about the disc, the disc located above a plane defined by a plurality of propellers of the first drone, the disc coupled to a shaft of the first drone, the acoustic sensors circumferentially arranged about a central axis defined by the shaft, the shaft coupled to and extending upward from a central body of the first drone, the acoustic sensors to detect acoustic signals;
   a collision prevention engine to determine a second route based on the acoustic signals detected by the acoustic sensors, the acoustic signals from a second drone, the collision prevention engine to cause the route manager to command the first drone to change course to track the second route to prevent a drone-to-drone collision between the first drone and the second drone; and
an acoustic transmitter coupled to the shaft at a location above the disc, the acoustic transmitter to broadcast an acoustic signal from the first drone, the acoustic transmitter including:
an acoustic transducer to convert an electrical signal generated at the first drone into the acoustic signal to be broadcast by the acoustic transmitter; and
a funnel-shaped case coupled to the acoustic transducer, the funnel-shaped case including a conical base and a cylindrical stem extending upward from the conical base, the conical base converging in a direction moving away from the central body and toward the cylindrical stem, the funnel-shaped case to modify a shape of the acoustic signal to be broadcast by the acoustic transmitter.

2. A control system as defined in claim 1, wherein the collision prevention engine includes:
a root mean square (RMS) value determiner to determine RMS values associated with the acoustic signals detected by the acoustic sensors;
a force value determiner to determine force values corresponding to the RMS values;
a model generator to generate a collision prevention model based on the force values; and
a model operator to execute the collision prevention model, the second route to be determined in response to execution of the collision prevention model.

3. A control system as defined in claim 1, wherein the acoustic signals detected by the acoustic sensors are ultrasonic acoustic signals.

4. A control system as defined in claim 1, wherein the acoustic sensors are directional microphones.

5. A control system as defined in claim 1, wherein the plane is a first plane, and the acoustic sensors are arranged along a second plane that is perpendicular to the central axis and parallel to the first plane.

6. A control system as defined in claim 1, wherein the acoustic transmitter is a speaker, and the acoustic signal to be broadcast by the acoustic transmitter is an ultrasonic acoustic signal.

7. A control system as defined in claim 1, wherein the funnel-shaped case is to convert the acoustic signal to be broadcast by the acoustic transmitter from a cylindrical waveform into a spherical waveform.

8. A system comprising:
a first drone; and
a non-transitory computer-readable storage medium comprising instructions that, when executed, cause one or more processors of the first drone to at least:
command the first drone to track a first route;
determine a second route based on acoustic signals from a second drone detected by a plurality of acoustic sensors coupled to a disc of the first drone, the acoustic sensors arranged at intervals about the disc, the disc located above a plane defined by a plurality of propellers of the first drone, the disc coupled to a shaft of the first drone, the acoustic sensors circumferentially arranged about a central axis of the shaft, the shaft extending upward from a central body of the first drone;
in response to determining the second route, command the first drone to change course to track the second route to prevent a drone-to-drone collision between the first drone and the second drone; and
broadcast, via an acoustic transmitter mounted at a location above the disc, an acoustic signal from the first drone while the first drone is tracking at least one of the first route or the second route;
wherein the acoustic transmitter includes:
an acoustic transducer to convert an electrical signal generated at the first drone into the acoustic signal to be broadcast by the acoustic transmitter; and
a funnel-shaped case coupled to the acoustic transducer, the funnel-shaped case to modify a shape of the acoustic signal to be broadcast by the acoustic transmitter, the funnel-shaped case including a conical base and a cylindrical stem extending upward from the conical base, the conical base converging in a direction moving away from the central body and toward the cylindrical stem.

9. A system as defined in claim 8, wherein the instructions, when executed, further cause the one or more processors of the first drone to:
determine root mean square (RMS) values associated with the acoustic signals detected by the acoustic sensors;
determine force values corresponding to the RMS values;
generate a collision prevention model based on the force values; and
execute the collision prevention model to determine the second route.

10. A system as defined in claim 8, wherein the acoustic signals detected by the acoustic sensors are ultrasonic acoustic signals.

11. A system as defined in claim 8, wherein the acoustic sensors are directional microphones.

12. A system as defined in claim 8, wherein the funnel-shaped case is to convert the shape of the acoustic signal to be broadcast from a cylindrical waveform into a spherical waveform.

13. A method comprising:
commanding a first drone to track a first route by executing a computer-readable instruction with one or more processors of the first drone;
determining, by executing a computer-readable instruction with the one or more processors of the first drone, a second route based on acoustic signals detected by a plurality of acoustic sensors coupled to a disc of the first drone, the acoustic sensors arranged at intervals about the disc, the disc located above a plane defined by a plurality of propellers of the first drone, the disc coupled to a shaft of the first drone, the acoustic sensors circumferentially arranged about a central axis defined by the shaft, the shaft mounted to and extending upward from a central body of the first drone, the acoustic signals being received from a second drone while the first drone is tracking the first route;
in response to the determining of the second route, commanding, by executing a computer-readable instruction with the one or more processors of the first drone, the first drone to change course to track the second route to prevent a drone-to-drone collision between the first drone and the second drone; and
broadcasting, via an acoustic transmitter coupled at a location above the disc, an acoustic signal from the first drone while the first drone is tracking at least one of the first route or the second route, the broadcasting of the acoustic signal including:
converting, via an acoustic transducer of the acoustic transmitter, an electrical signal generated at the first drone into the acoustic signal to be broadcast by the acoustic transmitter; and modifying, via a funnel-shaped case coupled to the acoustic transducer, a shape of the acoustic signal to be broadcast by the acoustic transmitter, the funnel-shaped case including a conical base and a cylindrical stem extending upward from the conical base, the conical base converging in a direction moving away from the central body and toward the cylindrical stem.

14. A method as defined in claim 13, further including:
determining, by executing a computer-readable instruction with the one or more processors of the first drone, root mean square (RMS) values associated with the acoustic signals detected by the acoustic sensors;
determining, by executing a computer-readable instruction with the one or more processors of the first drone, force values corresponding to the RMS values;
generating, by executing a computer-readable instruction with the one or more processors of the first drone, a collision prevention model based on the force values; and
executing the collision prevention model with the one or more processors of the first drone, the second route to be determined in response to the executing of the collision prevention model.

15. A method as defined in claim 13, wherein the acoustic signals detected by the acoustic sensors are ultrasonic acoustic signals.

16. A method as defined in claim 13, wherein the acoustic sensors are directional microphones.

17. A method as defined in claim 13, wherein the modifying includes converting the shape of the acoustic signal from a cylindrical waveform into a spherical waveform.

18. A control system of a first drone, the control system comprising:
at least one storage device; and
at least one processor to execute instructions to:
command the first drone to track a first route;
determine a second route based on acoustic signals from a second drone, the acoustic signals detected by a plurality of acoustic sensors coupled to a disc of the first drone, the acoustic sensors arranged at intervals about the disc, the disc located above a plane defined by a plurality of propellers of the first drone, the disc coupled to a shaft of the first drone, the acoustic sensors circumferentially arranged about a central axis defined by the shaft, the shaft coupled to and extending upward from a central body of the first drone;
command the first drone to change course to track the second route to prevent a drone-to-drone collision between the first drone and the second drone; and
broadcast an acoustic signal from an acoustic transmitter of the first drone, the acoustic transmitter coupled to the shaft at a location above the disc, the acoustic transmitter including:
an acoustic transducer to convert an electrical signal generated at the first drone into the acoustic signal to be broadcast by the acoustic transmitter; and
a funnel-shaped case coupled to the acoustic transducer, the funnel-shaped case including a conical base and a cylindrical stem extending upward from the conical base, the conical base converging in a direction moving away from the central body and toward the cylindrical stem, the funnel-shaped case to modify a shape of the acoustic signal to be broadcast by the acoustic transmitter.

19. A control system as defined in claim 18, wherein the at least one processor is further to execute instructions to:
determine root mean square (RMS) values associated with the acoustic signals detected by the acoustic sensors;
determine force values corresponding to the RMS values;
generate a collision prevention model based on the force values; and
execute the collision prevention model, the second route to be determined in response to execution of the collision prevention model.

20. A control system as defined in claim 18, wherein the acoustic signals detected by the acoustic sensors are ultrasonic acoustic signals.

21. A control system as defined in claim 18, wherein the acoustic sensors are directional microphones.

22. A control system as defined in claim 18, wherein the plane is a first plane, and the acoustic sensors are arranged along a second plane that is perpendicular to the central axis and parallel to the first plane.

23. A control system as defined in claim 18, wherein the acoustic transmitter is a speaker, and the acoustic signal to be broadcast by the acoustic transmitter is an ultrasonic acoustic signal.

24. A control system as defined in claim 18, wherein the funnel-shaped case is to convert the acoustic signal to be broadcast by the acoustic transmitter from a cylindrical waveform into a spherical waveform.

* * * * *